US010327536B2

(12) United States Patent
Pruess et al.

(10) Patent No.: US 10,327,536 B2
(45) Date of Patent: Jun. 25, 2019

(54) HUMAN EXOSKELETON DEVICES FOR HEAVY TOOL SUPPORT AND USE

(71) Applicant: Ekso Bionics, Inc., Richmond, CA (US)

(72) Inventors: Adam Pruess, Santa Rosa, CA (US);
Chris Meadows, Richmond, CA (US);
Kurt Amundson, Berkeley, CA (US);
Russ Angold, American Canyon, CA (US); James Lubin, Oakland, CA (US);
Mario Solano, Richmond, CA (US);
Tom Mastaler, Hercules, CA (US);
Nicholas Fleming, Oakland, CA (US);
Matt Sweeney, Sacramento, CA (US)

(73) Assignee: Ekso Bionics, Inc., Richmond, CA (US)

( * ) Notice: Subject to any disclaimer, the term of this patent is extended or adjusted under 35 U.S.C. 154(b) by 250 days.

(21) Appl. No.: 15/339,293

(22) Filed: Oct. 31, 2016

(65) Prior Publication Data

US 2017/0119132 A1     May 4, 2017

Related U.S. Application Data

(60) Provisional application No. 62/248,677, filed on Oct. 30, 2015.

(51) Int. Cl.
| | |
|---|---|
| *G05B 15/00* | (2006.01) |
| *G05B 19/00* | (2006.01) |
| *A45F 3/08* | (2006.01) |
| *B25J 9/00* | (2006.01) |
| *B25F 5/00* | (2006.01) |
| *A45F 3/04* | (2006.01) |

(Continued)

(52) U.S. Cl.
CPC ............... *A45F 3/08* (2013.01); *B25F 5/00* (2013.01); *B25J 9/0006* (2013.01); *A45F 2003/045* (2013.01); *A45F 2003/144* (2013.01); *A45F 2003/146* (2013.01); *A45F 2200/0575* (2013.01); *H01M 2/1022* (2013.01); *H01M 2220/30* (2013.01)

(58) Field of Classification Search
CPC .......... A45F 2003/045; A45F 2003/144; A45F 2003/146; A45F 2200/0575; A45F 3/08; B25F 5/00; B25J 9/0006; H01M 2220/30; H01M 2/1022
See application file for complete search history.

(56) References Cited

U.S. PATENT DOCUMENTS

| | | |
|---|---|---|
| 3,140,800 A | 7/1964 | Henderson |
| 3,900,140 A | 8/1975 | Kelso et al. |

(Continued)

*Primary Examiner* — Harry Y Oh
(74) *Attorney, Agent, or Firm* — Diederiks & Whitelaw, PLC.

(57) ABSTRACT

An exoskeleton includes strapping for coupling the exoskeleton to a wearer. The exoskeleton also includes a hip structure, a thigh link rotatably connected to the hip structure and a shank link rotatably connected to the thigh link. The weight of the exoskeleton is transferred to a surface on which the exoskeleton is standing through the hip structure, the thigh link and the shank link. An arm brace supports an arm of the wearer, and a telescopic link is rotatably connected to the arm brace. An energy storage device delivers power to a tool through a conduit, and a conduit-energy storage device coupling connects the conduit to the energy storage device.

20 Claims, 18 Drawing Sheets

(51) Int. Cl.
*H01M 2/10* (2006.01)
*A45F 3/14* (2006.01)

(56) References Cited

U.S. PATENT DOCUMENTS

| | | |
|---|---|---|
| 3,964,182 A | 6/1976 | Pomeret et al. |
| 4,483,070 A | 11/1984 | Junkermann |
| 5,385,536 A | 1/1995 | Burkhead et al. |
| 6,764,231 B1 | 7/2004 | Shubert |
| 6,916,124 B1 | 7/2005 | Correira |
| 7,397,014 B2 | 7/2008 | Hart et al. |
| 8,413,936 B2 | 4/2013 | Wang |
| 8,641,782 B2 | 2/2014 | Kim et al. |
| 8,827,216 B2 | 9/2014 | Brown et al. |
| 8,968,222 B2 | 3/2015 | Kazerooni et al. |
| 8,985,878 B2 | 3/2015 | Di Leo |
| 9,095,981 B2 | 8/2015 | Brown |
| 9,204,730 B2 | 12/2015 | Brown |
| 9,205,017 B2 | 12/2015 | Doyle |
| 9,421,143 B2 | 8/2016 | Caires et al. |
| 2011/0066088 A1 | 3/2011 | Little et al. |
| 2011/0264014 A1 | 10/2011 | Angold |
| 2014/0212243 A1 | 7/2014 | Yagi et al. |
| 2014/0240109 A1* | 8/2014 | Aviles ............... G08B 6/00 340/407.1 |
| 2015/0076196 A1 | 3/2015 | Brown et al. |
| 2015/0316204 A1 | 11/2015 | Doyle |
| 2015/0321341 A1* | 11/2015 | Smith ............... A61H 1/0237 623/27 |
| 2016/0031076 A1 | 2/2016 | Garrett et al. |
| 2017/0014984 A1* | 1/2017 | Rola ............... B25F 5/00 |
| 2017/0181916 A1* | 6/2017 | Klassen ............... B25J 3/04 |

\* cited by examiner

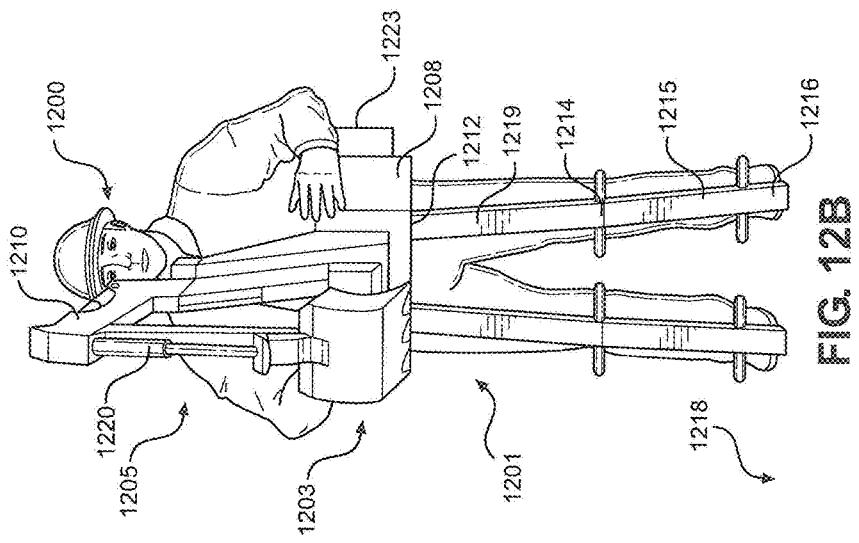
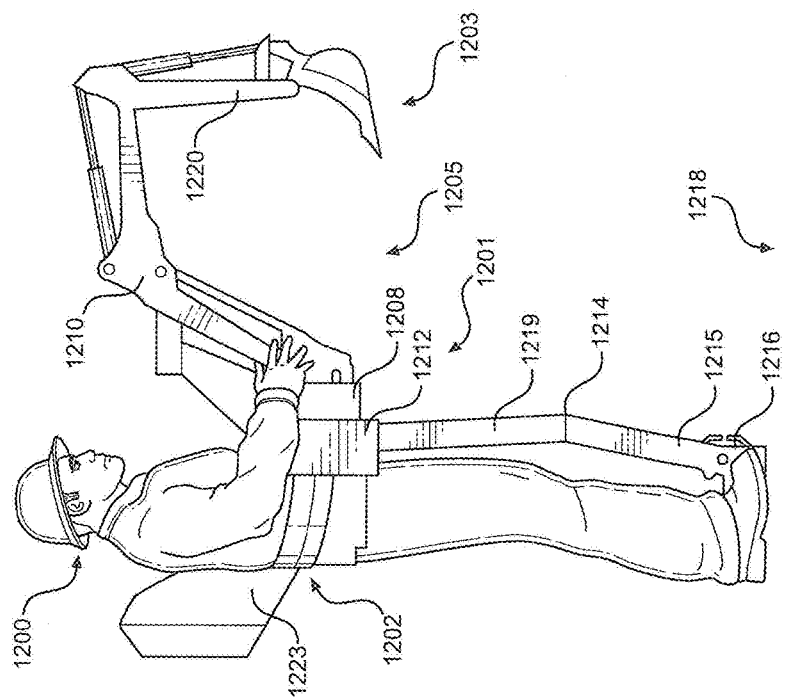

HUMAN EXOSKELETON DEVICES FOR HEAVY TOOL SUPPORT AND USE

CROSS REFERENCE TO RELATED APPLICATIONS

This application claims the benefit of U.S. Provisional Application No. 62/248,677, which was filed on Oct. 30, 2015 and titled "Human Exoskeleton Devices for Heavy Tool Support and Use". The entire content of this application is incorporated herein by reference.

FIELD OF THE INVENTION

The present invention relates to devices and methods that augment a wearer's carrying capacity and strength, increasing performance and aiding in the prevention of injury during the execution of certain load-bearing or strength-requiring tasks. More particularly, the present invention relates to devices suitable for use by a person engaging in heavy tool use or weight-bearing tasks, incorporating a set of artificial limbs, joints, and related control systems that potentiate improved function of the person's appendages for activities including, but not limited to, greater strength and endurance in the wearers legs, allowing for more weight to be carried by the wearer while walking and while performing same work tasks.

BACKGROUND OF THE INVENTION

Wearable exoskeletons have been designed for medical, commercial, and military applications. Medical exoskeletons are designed to help restore a user's mobility. Commercial and military exoskeletons help prevent injury and augment the user's strength. Commercial and military exoskeletons are used to alleviate loads supported by workers or soldiers during strenuous activities, thereby preventing injuries and increasing their stamina and strength.

Exoskeletons designed for use by able-bodied wearers often act to improve the wearer's stamina by transferring the weight of a tool or load through the exoskeleton structure and into the ground, thereby decreasing the weight borne by the wearer. In some cases, tool-holding exoskeletons are outfitted with a non-anthropomorphic tool-holding arm that supports the weight of the tool, reducing user fatigue by providing tool-holding assistance. The tool-holding arm transfers the vertical force required to hold the tool through the exoskeleton-supported tool-holding arm rather than through the user's arms and body. In other cases, the exoskeleton structure is generally anthropomorphic and acts in tandem with the user's body to support some or all of the tool weight by supporting the positioning of the wearer's arms and then transferring that tool weight around the body of the wearer and into the ground. Weight-bearing exoskeletons transfer the weight of the exoskeleton load through the legs of the exoskeleton rather than through the user's legs. In some cases, weight-bearing exoskeletons are designed to carry a specific load, such as a heavy backpack. In other cases, military weight-bearing exoskeletons support the weight of armor. Commercial and military exoskeletons can have actuated joints that augment the strength of the exoskeleton user, with these actuated joints being controlled by the exoskeleton control system, and with the exoskeleton user using any of a plurality of possible input means to command an exoskeleton control system.

In powered exoskeletons, exoskeleton control systems prescribe and control trajectories in the joints of an exoskeleton, resulting in the movement of the structure of the exoskeleton and, in some cases, the positioning of a tool supported by the exoskeleton. These control trajectories can be prescribed as position-based, force-based, or a combination of both methodologies, such as those seen in impedance controllers. Position-based control systems can be modified directly through modification of the prescribed positions. Force-based control systems can also be modified directly through modification of the prescribed force profiles. As exoskeleton users and exoskeleton tools vary in proportion, variously adjusted or customized powered exoskeletons will fit each user somewhat differently, requiring that the exoskeleton control system take into account these differences in exoskeleton user proportion, exoskeleton configuration/customization, exoskeleton user fit, and tool support, resulting in changes to prescribed exoskeleton trajectories. The exoskeleton user can control changes in exoskeleton trajectories through communication with the exoskeleton control system through a variety of means, including but not limited to body pressure sensors, joysticks, touchpads, gestural sensors, voice sensors, or sensors that directly detect nervous system activity.

In unpowered tool-holding exoskeletons, the exoskeleton wearer provides the force to move the exoskeleton structure and any affixed tools, with the exoskeleton aiding the wearer by supporting the weight of tools in certain positions or aiding in certain tool or exoskeleton movements. In both powered and unpowered tool-holding exoskeletons, the design of the exoskeleton structure, and in particular the structure of the tool-holding arm and tool-holding arm attachment point, or the structure of the anthropomorphic arm that aids in tool support, plays a significant role in the usefulness of the exoskeleton to the wearer in tool use applications. The specific structure of the exoskeleton arm or tool support structure is variably suitable to specific tools and specific motions that the wearer may engage in.

There exists a need to provide a range of devices allowing for an exoskeleton to assist an exoskeleton wearer by directly supporting the weight of various tools and the use of these tools by the exoskeleton wearer, increasing the strength and stamina of the exoskeleton wearer in tool-using tasks. There further exists a need to provide additional devices allowing for an exoskeleton to support the arms of an exoskeleton wearer in such a way as to improve the strength and stamina of the exoskeleton wearer in tool-using tasks. There further exists a need to allow an exoskeleton wearer to use tool types or tools in ways that would not be possible without the exoskeleton. There further exists a need for an exoskeleton device allowing for the exoskeleton to provide power to tools, with the energy source for these tools being supported by the exoskeleton frame but not by the arms of the exoskeleton or wearer. There further exists a need to provide counterbalancing support to an exoskeleton to support the weight of the tool and exoskeleton structure supporting the tool.

SUMMARY OF THE INVENTION

Disclosed herein are devices that allow for improvements in tool usability for wearers of both powered and unpowered exoskeletons, with some of these devices holding and supporting the weight of the tool directly, others improving the strength or endurance of the exoskeleton wearer while the wearer holds a tool, and other devices enabling the use of large tools that a person would not be able to operate without the exoskeleton device. In addition, devices are disclosed which improve the balance and weight distribution of tool-using exoskeletons.

It is one primary object of the present invention to provide a device and method that allows for the weight of a tool to be borne by a support structure affixed to an exoskeleton, with the weight of the tool being transferred through the support structure into the exoskeleton and the surface the exoskeleton stands upon, and with the exoskeleton wearer being able to manipulate this tool support structure in order to affect the position of the tool.

It is an additional object of the present invention to provide a device and method that allows for the improved balance of a tool-holding exoskeleton by transferring some or all of the weight of a tool's power source away from the tool or tool-holding arm and onto another portion of the exoskeleton structure. It is a further object to provide a device and method allowing for an exoskeleton to automatically adjust the position of this tool counterbalancing weight, so as to further improve the balance of the tool-supporting exoskeleton.

It is an additional object of the present invention to provide a device and method that allows for exoskeleton structures to support and/or improve the strength of the arms of an exoskeleton wearer, allowing the exoskeleton wearer to more easily manipulate and use tools or heavy items.

It is an additional object of the present invention to provide a device and method that allows for an exoskeleton to be equipped with types or sizes of tools that would be too awkward or too heavy for a person to use without the exoskeleton.

Concepts were developed to allow tool-holding arm devices, such as commercially available tool balancing arms for use in fixed industrial applications or similar devices, to be attached to the frame of a human exoskeleton device such that the exoskeleton wearer can use the tool-holding arm to support the weight of a tool and manipulate the position of the tool and tool-holding arm as desired during tool use activities, with the exoskeleton structure transferring the weight of the tool and tool-holding arm around the body of the exoskeleton wearer and into the surface upon which the exoskeleton and wearer are standing, with the exoskeleton and wearer also being able to walk across this surface to further alter the position of the tool as needed during tool use activities, and with the exoskeleton and tool-holding arm continuing to transfer the weight of the tool around the body of the exoskeleton wearer into the surface during walking.

Concepts were further developed to allow this tool-using arm to provide a conduit for power to the tool from the exoskeleton structure. This allows for energy storage devices, such as batteries, or power generation devices, such as internal combustion engines, to be relocated onto the frame of the exoskeleton, resulting in decreased tool mass, allowing for easier tool movement by the exoskeleton wearer, and improving the balance of the exoskeleton equipped with the tool-supporting arm. This also allows for plug-in corded tools to have a path for the power cord that is less likely to entangle the exoskeleton and wearer during tool movement or walking. In powered exoskeleton devices, power systems can be shared between the exoskeleton and tools.

Concepts were further developed for a tool-holding arm device to be comprised of telescoping cylinder members, with this telescoping tool-holding arm device being attached to the frame of a human exoskeleton device, with an additional tensile member connecting the exoskeleton frame to the tool-holding arm so as to provide vertical support to the tool-holding arm. This tool-holding arm is configured such that the exoskeleton wearer can use the tool-holding arm to support the weight of a tool and manipulate the position of the tool and tool-holding arm as desired during tool use activities, with the exoskeleton structure transferring the weight of the tool and tool-holding arm around the body of the exoskeleton wearer and into the surface upon which the exoskeleton and wearer are standing, with the exoskeleton and wearer also being able to walk across this surface to further alter the position of the tool as needed during tool use activities, and with the exoskeleton and tool-holding arm continuing to transfer the weight of the tool around the body of the exoskeleton wearer into the surface during walking.

Concepts were further developed to allow for a tool-holding structure to be comprised of two sets of telescoping cylinder members, with these telescoping members being connected to two points upon a rigid section of a human exoskeleton frame, and with these telescoping members triangulating and holding a tool, with this tool-holding structure being configured such that the exoskeleton wearer can use the tool-holding structure to support the weight of a tool and manipulate the position of the tool and tool-holding structure as desired during tool use activities, with the exoskeleton structure transferring the weight of the tool and tool-holding structure around the body of the exoskeleton wearer and into the surface upon which the exoskeleton and wearer are standing, with the exoskeleton and wearer also being able to walk across this surface to further alter the position of the tool as needed during tool use activities, and with the exoskeleton and tool-holding arm continuing to transfer the weight of the tool around the body of the exoskeleton wearer into the surface during walking.

Concepts were further developed to attach a support ring in the axial plane around an exoskeleton at the exoskeleton hips, with a tool-holding arm being mounted upon this support ring, with the base of this tool-holding arm being movable about the circumference of the support ring, allowing for the base of the tool-holding arm to be positioned at any point along the front half of the support ring, with the tool-holding arm containing additional links attached to the base, including links allowing for the tool-holding arm to extend out of the axial plane so as to allow the exoskeleton wearer to use a tool mounted on the support arm in a range of positions around the exoskeleton user. The weight of the support ring, tool-holding arm, and tool are transferred through the hips of the exoskeleton, around the exoskeleton wearer, through the exoskeleton legs and into the surface upon which the exoskeleton and wearer are standing.

Concepts were further developed to include a support ring in the axial plane around an exoskeleton, with a tool-holding arm being fixed to this support ring, with this support ring being mounted on the hips of the exoskeleton in such a way that the support ring can be rotated relative to the exoskeleton hips, allowing the exoskeleton wearer to reposition the base of exoskeleton tool-holding arm as needed, with the tool-holding arm containing additional links attached to the base, including links allowing for the tool support arm to extend out of the axial plane so as to allow the exoskeleton wearer to use a tool mounted on the tool-holding arm in a range of positions around the exoskeleton user. At a point opposite of the attachment point of the tool-holding arm on the rotatable support ring is an attachment point for a counterbalancing structure, with this counterbalancing structure offsetting the weight of the tool-holding arm and tool. As the support ring and affixed tool-holding arm are rotated about the exoskeleton wearer, the counterbalance rotates with them, automatically improving the balance of the exoskeleton. The weight of the support ring, tool-holding arm, counterbalance, and tool are transferred through the hips of the exoskeleton, around the exoskeleton wearer, and into the surface upon which the exoskeleton and wearer are standing.

Concepts were further developed to affix tensile members to the structure of an exoskeleton, with these tensile members being connected to arm braces that are attached to the arms of the exoskeleton wearer, and with these tensile members improving the stamina and/or strength of the exoskeleton wearer's arms.

Concepts were still further developed to affix telescoping members to the structure of an exoskeleton, with these telescoping members being connected to arm braces that are attached to the arms of the exoskeleton wearer, and with these telescoping members improving the stamina and/or strength of the exoskeleton wearer's arms.

Concepts were further developed for an arm-supporting device to be comprised of telescoping cylinder members, with this telescoping arm-supporting device being attached to the frame of a human exoskeleton device, and with an additional tensile member connecting the exoskeleton frame to the arm-supporting device so as to provide vertical support to the forearm of an exoskeleton wearer that is holding a heavy tool. This arm-supporting device is configured such that the exoskeleton wearer can use the arm-supporting device to help support the weight of a handheld tool and manipulate the position of the tool during tool use activities, with the exoskeleton structure transferring some of the weight of the tool around the body of the exoskeleton wearer and into the surface upon which the exoskeleton and wearer are standing, with the exoskeleton and wearer also being able to walk across this surface to further alter the position of the tool as needed during tool use activities, and with the exoskeleton and arm-supporting device continuing to transfer some of the weight of the tool around the body of the exoskeleton wearer into the surface during walking.

Concepts were further developed for an arm-supporting device to be comprised of telescoping cylinder members, with this telescoping arm-supporting device being attached to the frame of a human exoskeleton device to provide vertical support to the upper arm of an exoskeleton wearer that is holding a heavy tool. This arm-supporting device is configured such that the exoskeleton wearer can use the arm-supporting device to help support the weight of a tool and manipulate the position of the tool during tool use activities, with the exoskeleton structure transferring some of the weight of the tool around the body of the exoskeleton wearer and into the surface upon which the exoskeleton and wearer are standing, with the exoskeleton and wearer also being able to walk across this surface to further alter the position of the tool as needed during tool use activities, and with the exoskeleton arm-supporting device continuing to transfer some of the weight of the tool around the body of the exoskeleton wearer into the surface during walking.

Concepts were further developed to affix a support arm to the back of an exoskeleton's structure, with this support arm extending over the body of the exoskeleton wearer and in front of the exoskeleton wearer, allowing this support arm to act as a crane in vertical lifting activities in front of the exoskeleton wearer, with the weight of the tools or other objects lifted by the support arm being transferred through the support arm and into the exoskeleton frame, around the body of the exoskeleton wearer and into the surface upon which the exoskeleton and wearer are standing.

Concepts were further developed to affix a support arm to the back of an exoskeleton's structure, with this support arm including a telescoping structure that extends over the body of the exoskeleton wearer and substantially in front of the exoskeleton wearer, allowing this support arm to support a tool or instrument, such as a boom microphone, at a distance from the exoskeleton wearer. The exoskeleton wearer is additionally able to use his or her arms to interact with and guide the position of the support arm through a handle. The weight of the tools or other objects supported by the support arm is transferred through the support arm and into the exoskeleton frame, around the body of the exoskeleton user and into the surface upon which the exoskeleton and wearer are standing.

Concepts were further developed for an exoskeleton where the exoskeleton user stands and/or is affixed behind the bulk of the exoskeleton structure and a tool arm is attached to the front of the exoskeleton, with the exoskeleton user acting in part to balance the tool arm of the exoskeleton in the sagittal plane of the exoskeleton wearer.

In particular, the present invention is directed to an exoskeleton comprising strapping configured to couple the exoskeleton to a wearer. The exoskeleton also comprises a hip structure, a thigh link rotatably connected to the hip structure and a shank link rotatably connected to the thigh link. The weight of the exoskeleton is transferred to a surface on which the exoskeleton is standing through the hip structure, the thigh link and the shank link. An arm brace is configured to support an arm of the wearer, and a telescopic link is rotatably connected to the arm brace. An energy storage device is configured to deliver power to a tool through a conduit, and a conduit-energy storage device coupling is configured to connect a conduit to the energy storage device.

In certain embodiments, the arm brace is configured to support an upper arm of the wearer, and the telescopic link is rotatably connected to the hip structure. In another embodiment, the arm brace is configured to support a forearm of the wearer, and the telescopic link constitutes a first telescopic link. The exoskeleton further comprises a second telescopic link rotatably connected to the first telescopic link.

Preferably, the energy storage device is a battery. In various embodiments, the exoskeleton is a powered exoskeleton, and the energy storage device is further configured to deliver power to the exoskeleton. In another embodiment, the exoskeleton is an unpowered exoskeleton. Preferably, the battery is mounted on a rear of the exoskeleton.

In one embodiment, the exoskeleton further comprises a tool-holding arm configured to support a tool and a tool coupling configured to connect a tool to the tool-holding arm. A plurality of conduit guides is configured to route a conduit along the tool-holding arm. The exoskeleton can further comprise a hip coupling configured to connect the tool-holding arm to the hip structure.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 12A is a drawing showing a side view of a worker wearing a walk-behind exoskeleton equipped with an excavator arm affixed to the front of the exoskeleton and a power supply on the rear of the exoskeleton, representing the twelfth embodiment of this invention.

FIG. 12B is a drawing showing a front view of a worker wearing a walk-behind exoskeleton equipped with an excavator arm affixed to the front of the exoskeleton and a power supply on the rear of the exoskeleton, representing the twelfth embodiment of this invention.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1A:
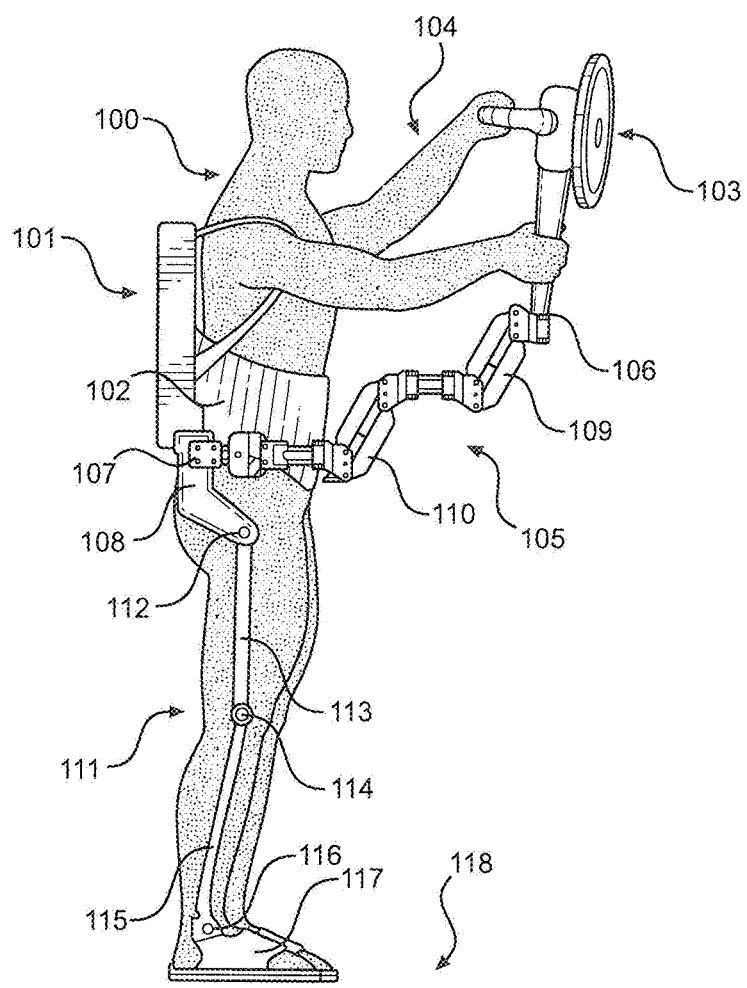
FIG. 1A is a drawing showing a side view of a worker wearing an exoskeleton equipped with a non-anthropomorphic tool-holding arm device and tool, representing the primary embodiment of this invention.

A primary embodiment of this invention is shown in FIG. 1A, with a person 100 wearing an exoskeleton 101, and with exoskeleton 101 being attached to person 100 by strapping 102. A hip structure 108 of exoskeleton 101 is connected to a tool-holding arm 105 at a hip coupling 107, with tool-holding arm 105 connecting to and supporting the weight of a tool 103 at a tool coupling 106. Tool-holding arm 105 is composed of an upper tool arm link 109 and a lower tool arm link 110, with the tool arm links of tool-holding arm 105 being flexibly connected such that they are movable relative to each other so as to allow person 100 to use arms 104 to change the position of tool 103 relative to exoskeleton 101 and person 100. The weight of tool 103 is transferred through tool coupling 106 to upper tool arm link 109, then to lower tool arm link 110, then to hip coupling 107 and into hip structure 108 of exoskeleton 101. Hip structure 108 is rotatably connected to a thigh link 113 at a hip 112, with thigh link 113 being rotatably connected to a shank link 115 at a knee 114, with shank link 115 being rotatably connected to a foot structure 117 at an ankle 116. This connectivity allows the weight of exoskeleton 101, tool 103, and tool-holding arm 105 to be transferred around legs 111 of person 100, through hip structure 108, through thigh link 113 and shank link 115, into foot structure 117 and ultimately to a surface 118. Person 100 can also walk while wearing exoskeleton 101, with exoskeleton 101 continuing to support the weight of tool 103 and tool-holding arm 105. In some embodiments, the tool-holding arm is an unpowered commercially available device such as the Equipois zeroG™, or another mountable tool-holding arm known in the art. In some embodiments, the tool-holding arm has more than two movable structural links.

Figure 1B:
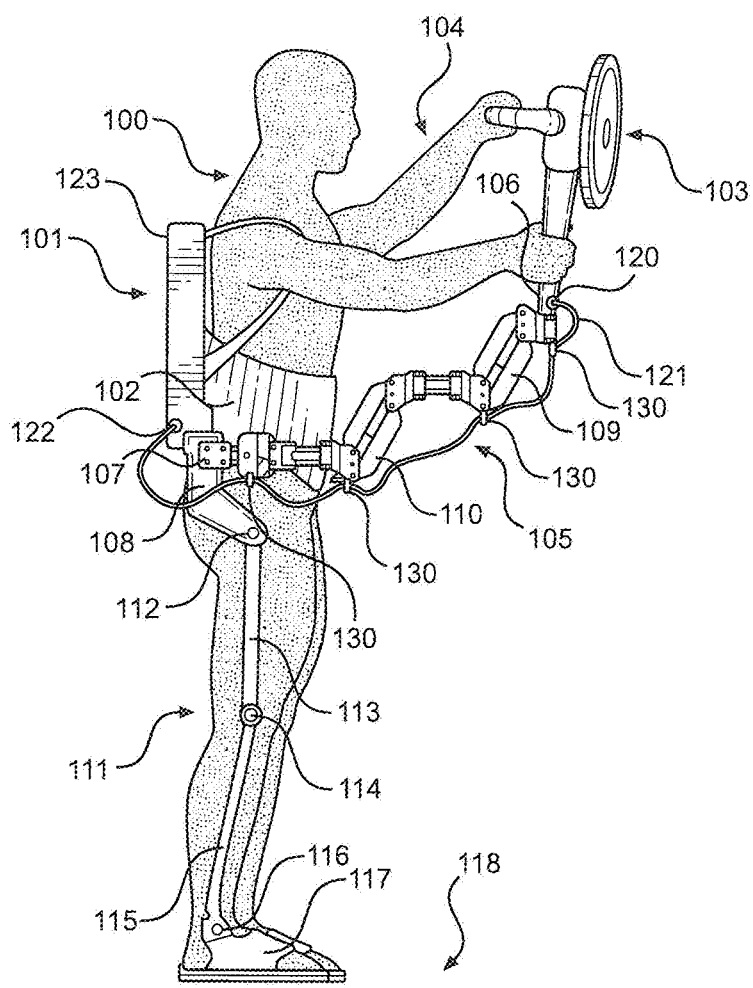
FIG. 1B is a drawing showing a side view of a worker wearing an exoskeleton equipped with a hip-mounted non-anthropomorphic tool-holding arm device and tool, with this tool drawing power from an energy source mounted on the structure of the exoskeleton distal to the tool, representing an additional element of the primary embodiment of this invention.

An additional element of the primary embodiment is shown in FIG. 1B, where tool 103 receives power from an energy storage device 123, with energy storage device 123 being mounted on the opposite side of exoskeleton 101 from tool 103, with tool 103 drawing power through a conduit 121, with conduit 121 connecting to tool 103 at a conduit-tool coupling 120 and to energy storage device 123 at a conduit-energy storage device coupling 122, and with conduit 121 being routed along tool-holding arm 105 at conduit guides 130. In some embodiments, the energy storage device is a battery, a compressed air cylinder, a fuel cell, or other energy storage device known in the art. In some embodiments, the energy storage device is replaced or augmented with an internal combustion engine coupled to an electrical generator, compressed air cylinder, or hydraulic pump. In some embodiments, the energy storage device acts as a power routing/adaptor system, allowing continuous or intermittent interface between the exoskeleton and an external power supply. In some embodiments, the conduit is an electrical cord, compressed air hose, hydraulic line, mechanical transfer line, or other energy transfer device known in the art. In some embodiments, the exoskeleton is powered, and power is shared between the powered exoskeleton systems and the tool. In other embodiments, the exoskeleton is passive, and only the tool and related systems receive or require power.

As an example of the primary embodiment of this invention, consider a shipyard worker on a scaffolding cleaning the hull of a ship in dry-dock with a heavy grinder tool. Through use of the primary embodiment of this invention, this worker could hold the grinder over his or her head or away from his or her body for much longer periods of time than without the device of the primary embodiment of this invention, as the tool-holding arm and exoskeleton support the weight of the tool. This increase in stamina would also lead to increased productivity and a reduced chance of worker injury. In addition, through use of the additional element of the primary embodiment of this invention, the safety of the worker is further increased by improving the balance of the exoskeleton through weight redistribution and balancing and by routing of power cords in such a way as to reduce the likelihood of the worker becoming entangled in or tripping on cords in a hazardous work environment. In addition to improving safety, preventing cord tangle has the added benefit of improving exoskeleton maneuverability in certain enclosed environments.

Figure 2:
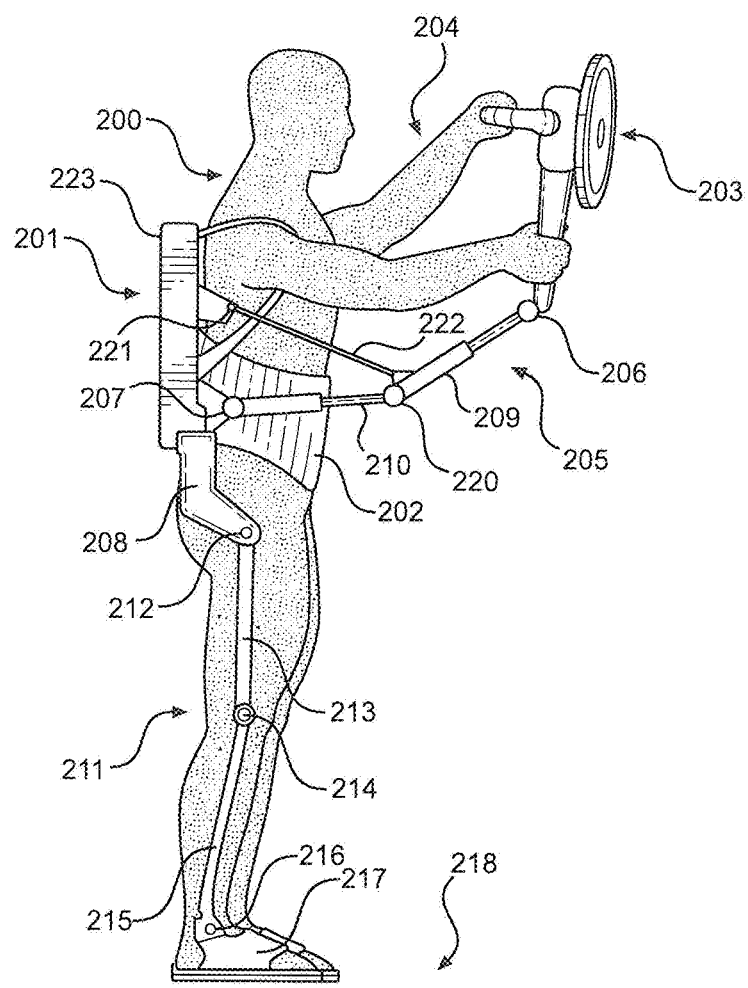
FIG. 2 is a drawing showing a side view of a worker wearing an exoskeleton equipped with a hip-mounted non-anthropomorphic tool-holding arm device and tool, representing the second embodiment of this invention.

The second embodiment of this invention is shown in FIG. 2, with a person 200 wearing an exoskeleton 201, and with exoskeleton 201 being attached to person 200 by strapping 202. A hip structure 208 of exoskeleton 201 is rotatably connected to a tool-holding arm 205 at a hip coupling 207, with tool-holding arm 205 connecting to and supporting the weight of a tool 203 at a tool coupling 206. Tool-holding arm 205 is comprised of an upper telescoping link 209 and a lower telescoping link 210, with the telescoping links of tool-holding arm 205 being adjustable in length and rotatably connected at a link joint 220 such that they allow person 200 to use arms 204 to change the position of tool 203 relative to exoskeleton 201 and person 200. The weight of tool 203 is transferred through tool coupling 206, to upper telescoping link 209 and then to both lower telescoping link 210 and a tensile member 222. Lower telescoping link 210 transfers a portion of the tool weight to hip coupling 207 and into hip structure 208 of exoskeleton 201, while tensile member 222 transfers the remainder of the weight of tool 203 through tensile member connector 221, to an exoskeleton back structure 223 and into hip structure 208 of exoskeleton 201. Hip structure 208 is rotatably connected to a thigh link 213 at a hip 212, with thigh link 213 being rotatably connected to a shank link 215 at a knee 214, and with shank link 215 being rotatably connected to a foot structure 217 at an ankle 216. This connectivity allows the weight of exoskeleton 201, tool 203, and tool-holding arm 205 to be transferred around legs 211 of person 200, through hip structure 208, through thigh link 213 and shank link 215, into foot structure 217 and ultimately to a surface 218. Person 200 can also walk while wearing exoskeleton 201, with exoskeleton 201 continuing to support the weight of tool 203 and tool-holding atm 205. In some embodiments, the tool-holding arm has more than two telescoping links. In some embodiments, the telescoping links are comprised of more than two cylinders. In some embodiments, the telescoping links are passive. In some embodiments, one or more of the telescoping links are lockable at certain lengths. In some embodiments, one or more of the telescoping links are powered. In some embodiments, the hip coupling is a ball joint. In some embodiments, the hip coupling is a hinge joint, restricting the movement of this joint to a single plane. In some embodiments, the hip coupling joint is fixable at a specific angle. In some embodiments, the link joint is a ball joint. In some embodiments, the link joint is a hinge joint, restricting the movement of this joint to a single plane. In some embodiments, the link joint is fixed at a specific angle, such as 45 degrees or 90 degrees. In some embodiments, the tensile member is rigid. In some embodiments, the tensile member has some stretch. In some embodiments, the tensile member is adjustable in length. In some embodiments, the tensile member is adjustable in length through use of a powered device such as a small winch.

As an example of the second embodiment of this invention, consider a worker in a high-rise construction environment using a heavy rivet setting tool to rivet steel beams together. Through use of the second embodiment of this invention, this worker can hold the riveter over his or her head or away from his or her body for much longer periods of time than without the device of the second embodiment of this invention, as the tool-holding arm and exoskeleton support the weight of the tool. This increase in worker stamina would also lead to a reduced chance of worker injury and increased productivity.

Figure 3A:
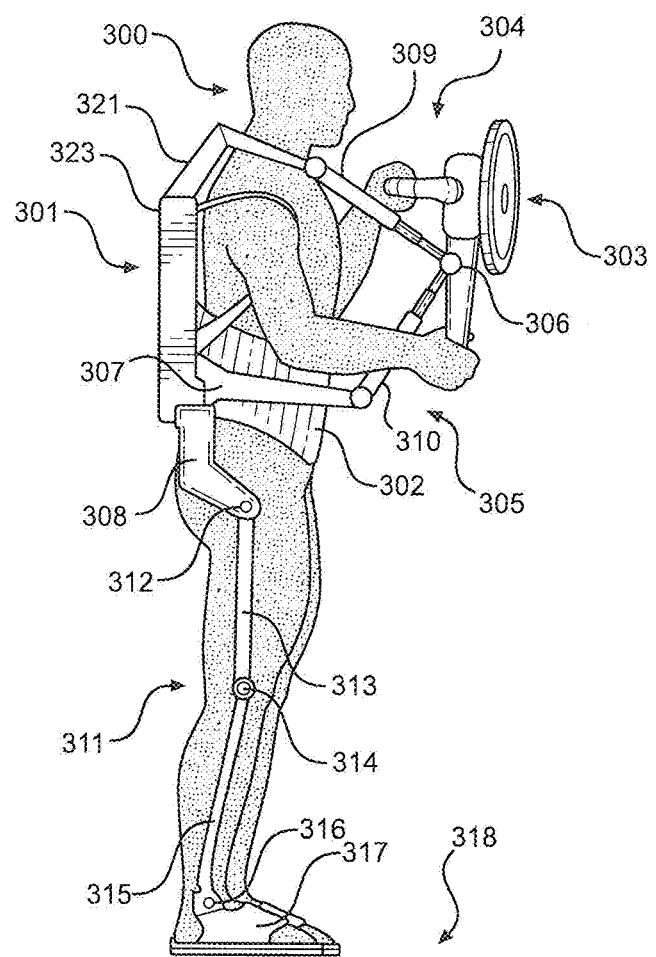
FIG. 3A is a drawing showing a side view of a worker wearing an exoskeleton equipped with a hip- and shoulder-mounted non-anthropomorphic tool-holding device and tool, representing the third embodiment of this invention.
Figure 3B:
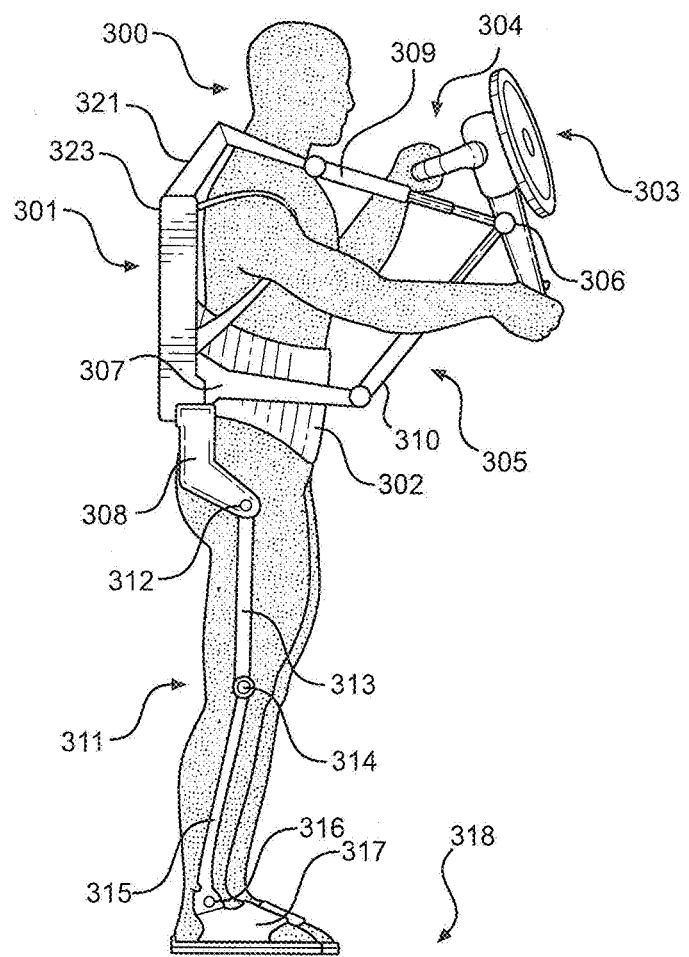
FIG. 3B is a drawing showing a side view of a worker wearing an exoskeleton equipped with a hip- and shoulder-mounted non-anthropomorphic tool-holding device and tool, with the worker, tool-holding device, and tool being shown in an alternative position relative to FIG. 3A, representing the third embodiment of this invention.
Figure 4A:
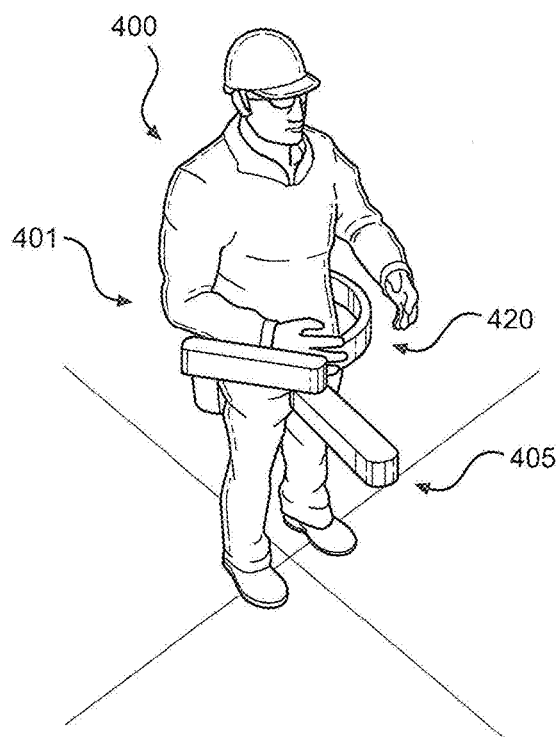
FIG. 4A is a drawing showing a perspective view of a worker wearing an exoskeleton equipped with a tool-holding arm mounted on an r-theta revolute joint in the axial plane, representing the fourth embodiment of this invention.
Figure 4B:
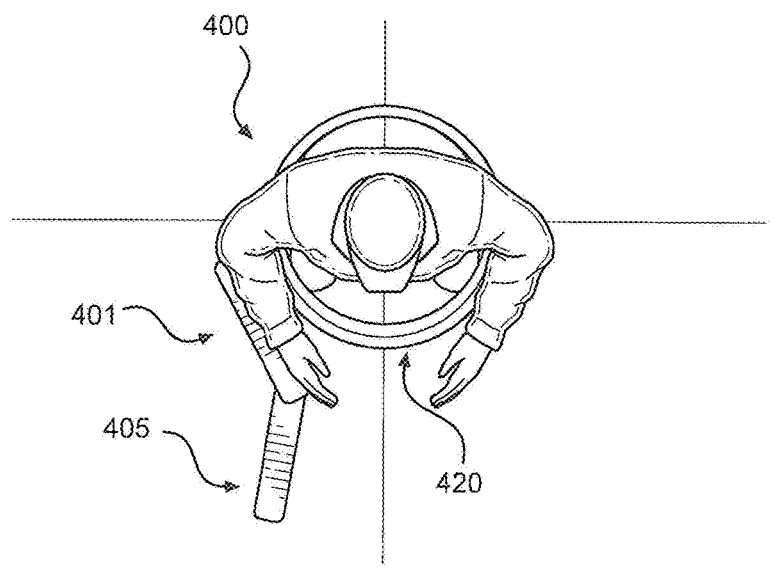
FIG. 4B is a drawing showing a top view of a worker wearing an exoskeleton equipped with a tool-holding arm mounted on an r-theta revolute joint in the axial plane, representing the fourth embodiment of this invention.
Figure 4C:
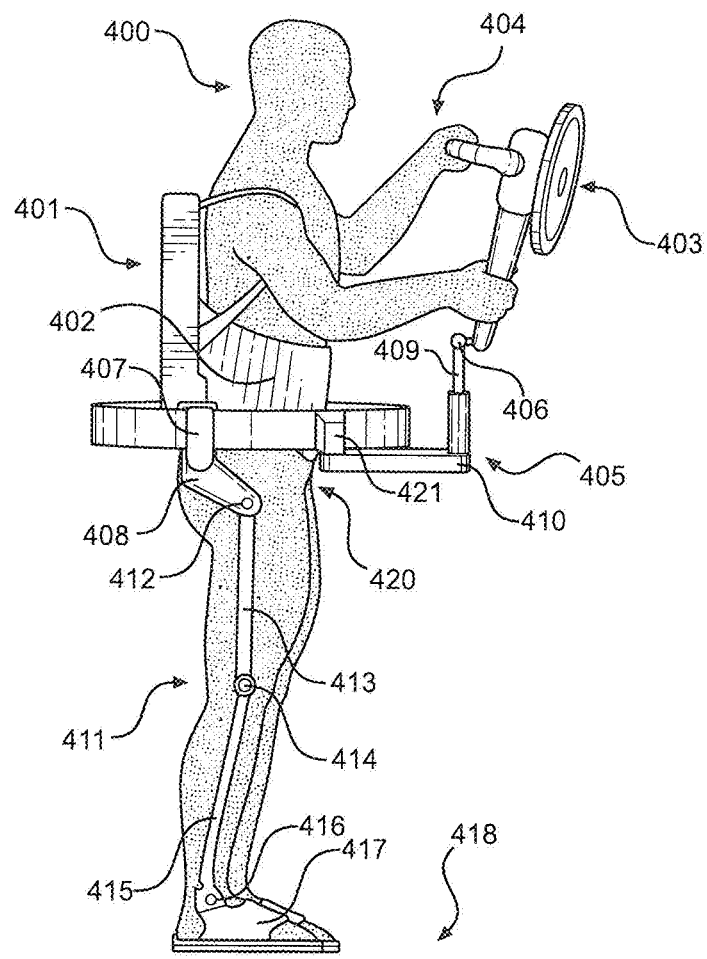
FIG. 4C is a drawing showing a side view of a worker wearing an exoskeleton equipped with a tool-holding arm mounted on an r-theta revolute joint in the axial plane, with this tool-holding arm including an additional vertical support attached to a tool, representing the fourth embodiment of this invention.
Figure 4D:
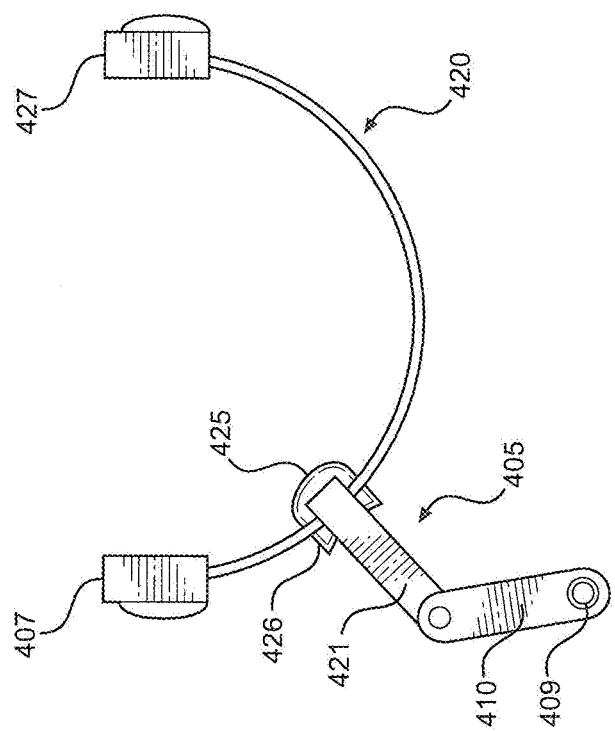
FIG. 4D is a drawing showing a simplified top view of the exoskeleton hips and a movable tool-holding arm mounted on a fixed semi-circular support ring in the axial plane, representing the fourth embodiment of this invention.

The third embodiment of this invention is shown in FIGS. 3A and 3B, with a person 300 wearing an exoskeleton 301, and with exoskeleton 301 being attached to person 300 by strapping 302. A back structure 323 of exoskeleton 301 is connected to a tool-holding structure 305 at a lower brace 307 and an upper brace 321, with lower brace 307 being rotatably connected to a lower telescoping link 310, with upper brace 321 being rotatably connected to an upper telescoping link 309, and with both lower telescoping link 310 and upper telescoping link 309 being rotatably connected to a tool 303 at a tool coupling 306. Tool-holding structure 305 is configured such that lower telescoping link 310 and upper telescoping link 309 are both adjustable in length and rotatably connected to both tool 303 and exoskeleton 301 such that person 300 can use arms 304 to change the position of tool 303 relative to exoskeleton 301 and person 300. This adjustable tool-holding structure provides a particularly strong and stable tool connection platform, effectively forming a triangle structure with one fixed-length side, three variable angles and two variable-length sides. The weight of tool 303 is transferred through tool coupling 306 to both upper telescoping link 309 and lower telescoping link 310, then to upper brace 321 and lower brace 307, respectively, then to back structure 323 and into a hip structure 308. Hip structure 308 is rotatably connected to a thigh link 313 at a hip 312, with thigh link 313 being rotatably connected to a shank link 315 at a knee 314, and with shank link 315 being rotatably connected to a foot structure 317 at an ankle 316. This connectivity allows the weight of exoskeleton 301, tool 303, and tool-holding arm 305 to be transferred around legs 311 of person 300, through hip structure 308, through thigh link 314 and shank link 316, into foot structure 317 and ultimately to surface 318. Person 300 can also walk while wearing exoskeleton 301, with exoskeleton 301 continuing to support the weight of tool 303 and tool-holding arm 305. In some embodiments, the telescoping links are passive. In some embodiments, one or more of the telescoping links are lockable at certain lengths. In some embodiments, one or more of the telescoping links are powered. In some embodiments, the upper link connects to the chest or another location of the exoskeleton wearer, rather than going over the shoulder. In some embodiments, one or more of the joints of the arm structure are ball joints. In some embodiments, one or more of the joints of the arm structure are hinge joints, restricting the movement of these joints to a single plane.

As an example of the third embodiment of this invention, consider a worker in a timber cutting environment using a very large chainsaw to fell trees. Through the use of the third embodiment of this invention, this worker can hold and stably operate the chainsaw for much longer periods of time than without the device of the third embodiment of this invention, as the tool-holding structure and exoskeleton support the weight of the chainsaw. This increase in worker stamina would also lead to increased productivity and a reduced chance of worker injury.

The fourth embodiment of this invention is shown in FIGS. 4A-D, with a person 400 wearing an exoskeleton 401, with exoskeleton 401 being attached to person 400 by strapping 402, with exoskeleton 401 having a tool-holding arm 405 mounted upon a support ring 420, with support ring 420 being affixed to a hip structure 408 of exoskeleton 401 at a right hip connector 407 and at a left hip connector 427, and with a tool 403 being affixed to and supported by tool-holding arm 405. Tool-holding arm 405 is comprised of an arm base 425 and a primary link 421, with arm base 425 and primary link 421 being mounted on and interacting with support ring 420, with primary link 421 being rotatably connected (in the axial plane) to a secondary link 410, with secondary link 410 being connected to a telescoping vertical link 409, with telescoping vertical link 409 being rotatably connected to a tool mount 406, and with tool mount 406 being connected to tool 403. Tool-holding arm 405 and support ring 420 are configured such that the position of tool-holding arm 405 along with support ring 420 can be changed as desired by person 400 to facilitate the use of tool 403, such that the relative positions of primary link 421, secondary link 410, telescoping vertical link 409, and tool 403 can be adjusted by person 400 to facilitate use of tool 403 with arms 404. Hip structure 408 is rotatably connected to a thigh link 413 at a hip 412, with thigh link 413 being rotatably connected to a shank link 415 at a knee 414, with shank link 415 being rotatably connected to a foot structure 417 at an ankle 416. This connectivity allows the weight of exoskeleton 401, tool 403, and tool-holding arm 405 to be transferred around legs 411 of person 400, through hip structure 408, through thigh link 413 and shank link 415, into foot structure 417 and ultimately to a surface 418. Person 400 can also walk while wearing exoskeleton 401, with exoskeleton 401 continuing to support the weight of tool 403 and tool-holding arm 405. In some embodiments, the movement of tool-holding arm 405 about support ring 420 is powered. In some embodiments, the movement of tool-holding arm 405 about support ring 420 is passively controlled by the exoskeleton wearer. The interaction between tool-holding arm 405 and support ring 420 can make use of wheels, clamps, intermeshing gears, chain drives, or other means known in the art. In some embodiments, the telescoping link is comprised of more than two cylinders. In some embodiments, the movements of the tool-holding arm components are powered. In other embodiments, the movements of the tool-holding arm components are passive. In some embodiments, the telescoping link is connected to the secondary link by a ball joint. In some embodiments, there are more than two links in the axial plane. In some embodiments, these axial plane links are not fixed in the axial plane. In some embodiments, such as that shown in FIG. 4D, the support ring is semicircular, only existing in front of the exoskeleton wearer. In other embodiments, the ring is fully circular to promote balance. In some embodiments, the ring is elliptical. In some embodiments, the ring is not bound to the hips but to another structure on the exoskeleton.

As an example of the fourth embodiment of this invention, consider a worker in a shipyard environment grinding the hull of a ship in dry-dock with a very heavy grinder tool. Through the use of the fourth embodiment of this invention, this worker can hold the grinder over his or her head or away from his or her body for much longer periods of time than without the device of the fourth embodiment of this invention, as the tool-holding arm and exoskeleton support the weight of the tool. If this were a powered exoskeleton, the tool arm could additionally lift the tool using the telescoping link to apply grinder pressure against the hull, without the worker having to exert an additional force, and with the exoskeleton's tool arm and frame absorbing the downward counteracting force and transferring the force around the worker, effectively increasing the strength of the worker, in addition to increasing the worker's stamina. This increase in stamina would also lead to increased productivity and a reduced chance of worker injury.

Figure 5A:
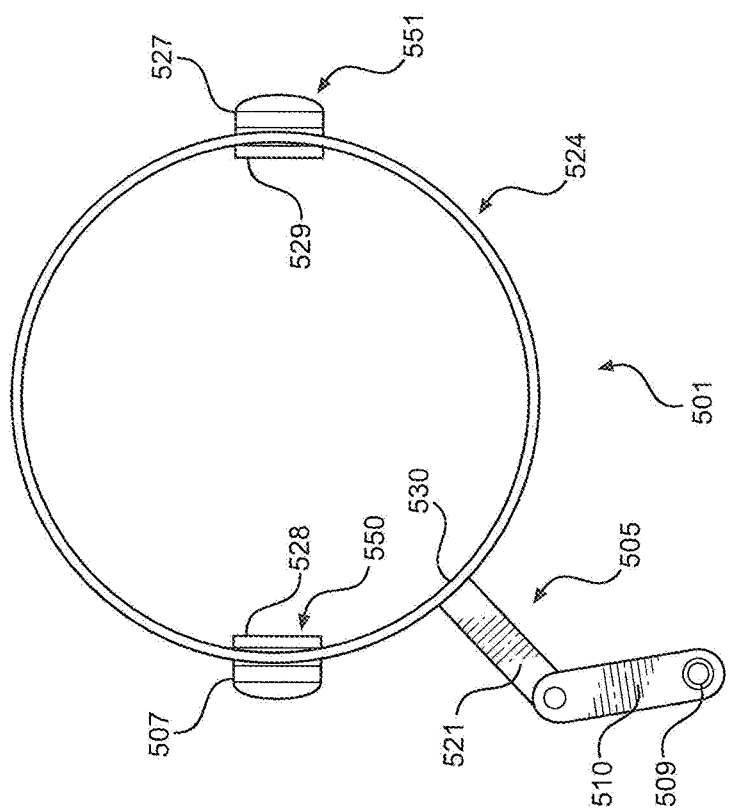
FIG. 5A is a drawing showing a simplified sectional top view of an exoskeleton equipped with a fixed tool-holding arm mounted on a rotating support ring in the axial plane, representing the fifth embodiment of this invention.
Figure 5B:
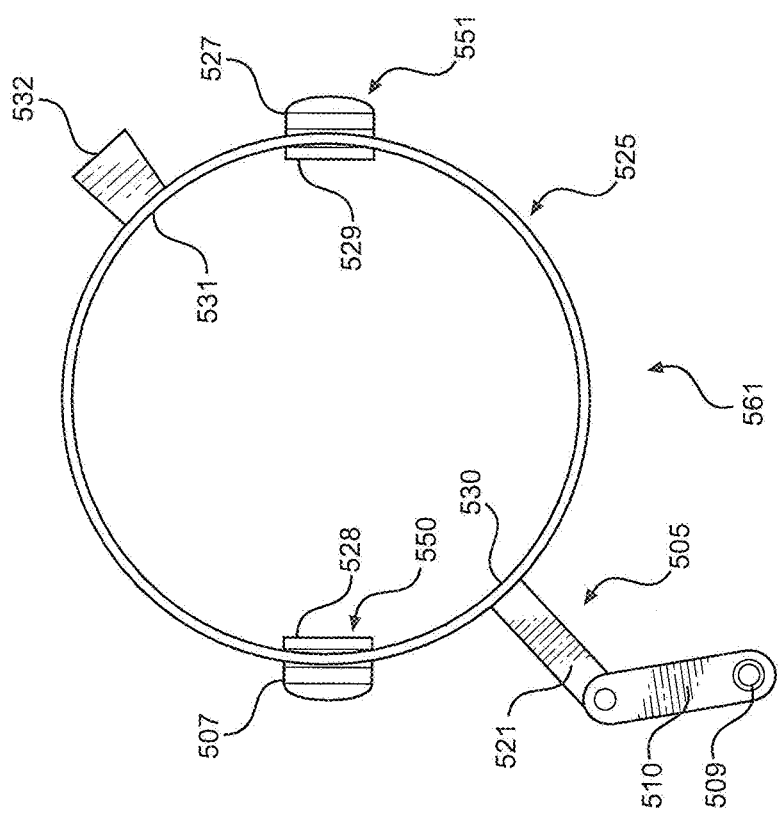
FIG. 5B is a drawing showing a simplified sectional top view of an exoskeleton equipped with a fixed tool-holding arm mounted on a rotating support ring in the axial plane, with an additional counterweight being mounted on the support ring at a position opposite the tool-holding arm, representing an additional element of the fifth embodiment of this invention.

The fifth embodiment of this invention is shown in FIGS. 5A and 5B and is visually and conceptually similar to the fourth embodiment of this invention, with a support ring in the axial plane around the exoskeleton and wearer, and a movable tool arm on the ring. In the fourth embodiment, the tool arm is mounted upon and moves along the ring, with the ring being fixed to the exoskeleton structure. In the fifth embodiment, the tool arm is attached to a fixed position on the ring, and the support ring itself rotates around the exoskeleton structure, with this ring rotation changing the position of the tool arm relative to the exoskeleton structure similar to the way that a turret changes the position of a weapon along a mounting ring relative to a vehicle. In FIG. 5A, a support ring 524 is mounted at a right hip 550 and a left hip 551 of an exoskeleton 501, with support ring 524 being held and guided by a right outer ring guide 507, a right inner ring guide 528, a left outer ring guide 527, and a left inner ring guide 529. Tool-holding arm 505 is affixed to support ring 524 at an arm mount 530, with tool-holding arm 505 being comprised of a primary link 521, a secondary link 510, and a telescoping vertical link 509. Support ring 524 can be rotated in the axial plane, being guided by, supported by, and passing through both right hip 550 and left hip 551, with the position of tool-holding arm 505 relative to both right hip 550 and left hip 551 being altered as support ring 524 rotates.

In FIG. 5B, a support ring 525 is mounted at right hip 550 and left hip 551 of an exoskeleton 561, with support ring 525 being affixed to both tool-holding arm 505 and a support ring counterweight 532, with support ring counterweight 532 being affixed to support ring 525 at a counterweight mount 531, and with counterweight mount 531 being on the opposite side of support ring 525 relative to mount 530. As support ring 525 is rotated, the relative positions of arm mount 530 and counterweight mount 531 remain unchanged, allowing for support ring 525 to be rotated with minimal changes to the balance of exoskeleton 561. In some embodiments, the movement of the tool-holding arm and support ring is powered. In some embodiments, the movement of the tool-holding arm and support ring is manually adjusted by the exoskeleton wearer. The interaction between the support ring and the mounting and guiding devices on the exoskeleton frame can make use of wheels, clamps, intermeshing gears, chain drives, or other means known in the art. In some embodiments, the movements of the tool-holding arm components are powered. In other embodiments, the movements of the tool-holding arm components are passive. In some embodiments, the ring is not bound to the hips but to another structure on the exoskeleton. In some embodiments, the arm and counterweight mounts on the support ring are not 180 degrees opposed. In some embodiments, the counterweight's relative position to the arm mount is adjustable. In some embodiments, there are more than one arm mount or counterweight mount on the support ring. In some embodiments, the counterweight is the energy supply that is used to power the tool and/or exoskeleton. In some embodiments, the counterweight is a second tool-holding arm and tool.

As an example of the fifth embodiment of this invention, consider a worker in a mining, quarry, or deconstruction environment using a heavy jackhammer-like tool to bore horizontally into rock or cement. Through use of the fifth embodiment of this invention, this worker can hold the jackhammer horizontally and in various angles for much longer periods of time than without the device of the fifth embodiment of this invention, as the tool-holding arm and exoskeleton support the weight of the tool, with the counterweight mounted on the support ring allowing the tool position to be adjusted without unbalancing the exoskeleton. In addition to the improved productivity granted to the worker by allowing increased tool usage time, the improved balance also greatly reduces the chance of a worker injury during this hazardous tool-usage task.

Figure 6A:
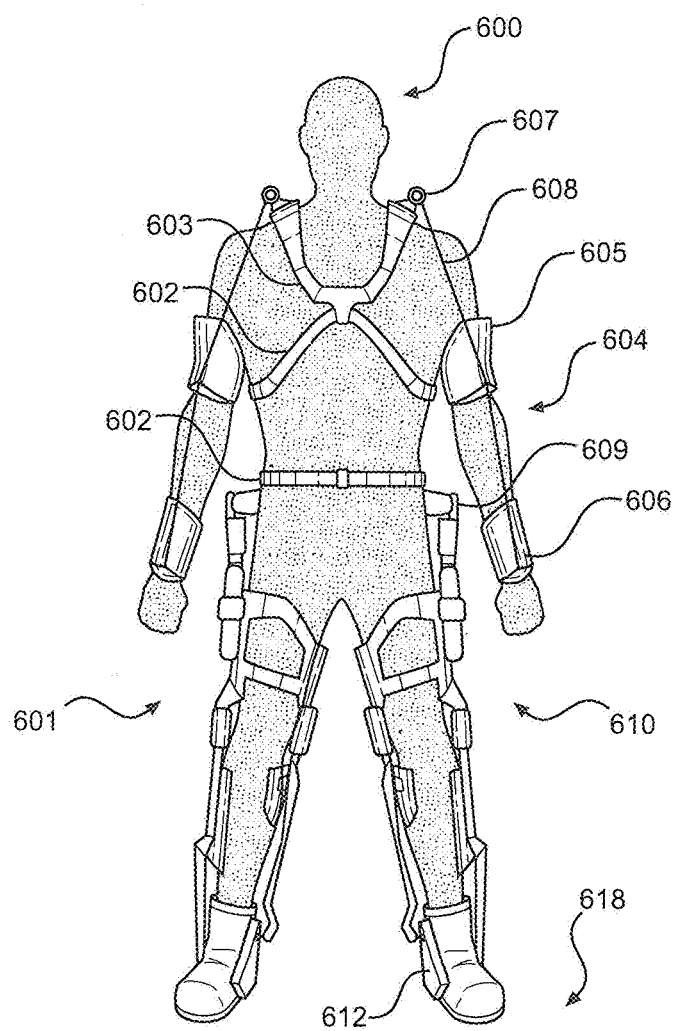
FIG. 6A is a drawing showing a front view of a person wearing an exoskeleton equipped with tensile members and arm couplings that link the arms of the person to the frame of the exoskeleton, representing the sixth embodiment of this invention.
Figure 6B:
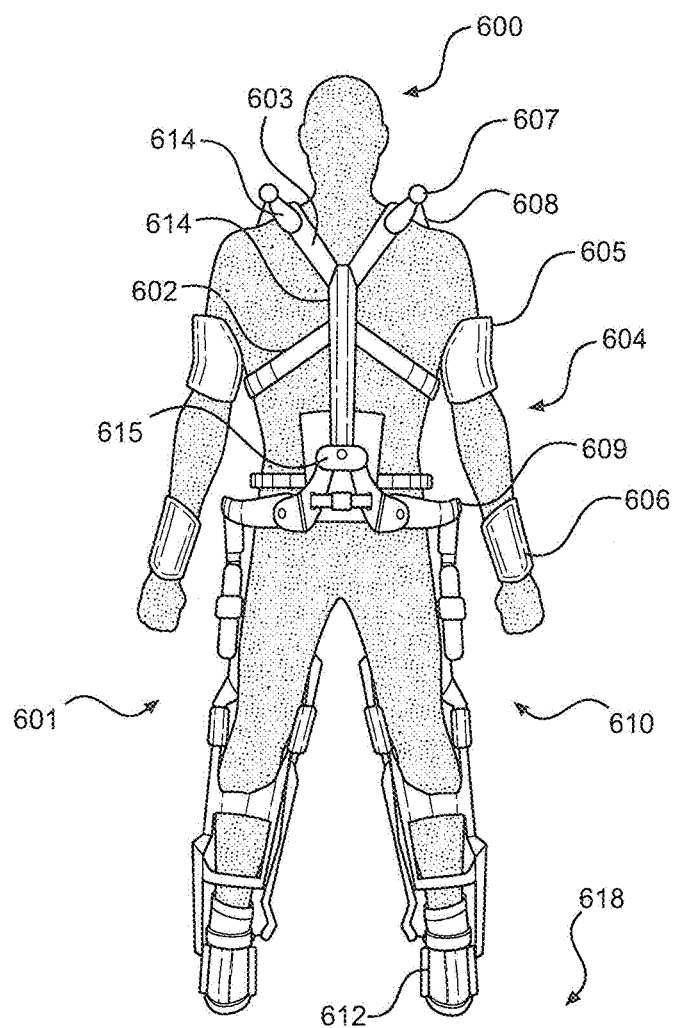
FIG. 6B is a drawing showing a rear view of a person wearing an exoskeleton equipped with tensile members and arm couplings that link the arms of the person to the frame of the exoskeleton, representing the sixth embodiment of this invention.

The sixth embodiment of this invention is shown in FIGS. 6A and 6B, in which a person 600 is wearing an exoskeleton 601, with exoskeleton 601 being attached to person 600 by strapping 602, with exoskeleton 601 having a back structure 614 supporting a yoke 603, with a tensile member mount 613 being connected to yoke 603, with a tensile member connection point 607 being connected to a tensile member 608, and with tensile member 608 being connected to an upper arm brace 605 and a forearm brace 606. Upper arm brace 605 and forearm brace 606 are coupled to an arm 604 of person 600. Force is transferred through tensile member 608 to tensile member connection point 607 and tensile member mount 613, to yoke 603, to back structure 614, to a back-hip interface 615, to an exoskeleton hip 609, to an exoskeleton leg structure 610, to an exoskeleton foot structure 612, and ultimately to a surface 618. In some embodiments, the tensile member is rigid, acting to brace the exoskeleton wearer's arms in certain positions. In some embodiments, the tensile member has some stretch, increasing the user's strength in certain motions, while increasing the resistance to arm movement in other motions. In some embodiments, the tensile member is adjustable in length. In some embodiments, the tensile member is adjustable in length through the use of a powered device such as a small winch. In powered embodiments, the length of the tensile member is shortened during arm flexing motions (e.g., bicep curling/lifting) by the exoskeleton wearer to augment the strength of the arms. In some embodiments, a similar system of tensile members is located on the back of the exoskeleton to strengthen the exoskeleton wearer in arm extension (tricep-engaging) motions. In some embodiments, only upper arm braces are connected to the tensile member. In some embodiments, multiple tensile members connect the upper and lower arm braces to the exoskeleton structure.

As an example of the sixth embodiment of this invention, consider a worker in a construction environment engaged in the lifting and movement of construction materials. If this worker were wearing an exoskeleton equipped with a powered embodiment of the sixth embodiment of this invention, the worker would be able to lift more construction materials with his or her arms and carry that material farther with less fatigue and risk of injury.

Figure 7:
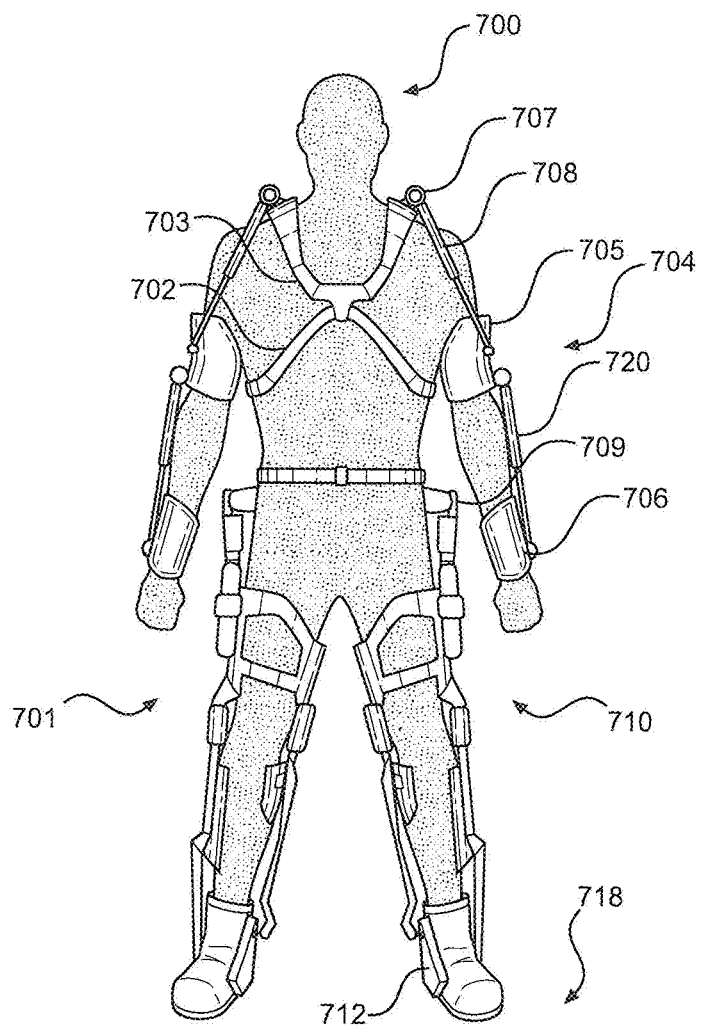
FIG. 7 is a drawing showing a front view of a person wearing an exoskeleton equipped with telescoping cylinders and arm couplings that link the arms of the person to the frame of the exoskeleton, representing the seventh embodiment of this invention.

The seventh embodiment of this invention is shown in FIG. 7, in which a person 700 is wearing an exoskeleton 701, with exoskeleton 701 being attached to person 700 by strapping 702, with exoskeleton 701 having a back structure (not visible in FIG. 7 but analogous to back structure 614 shown in FIG. 6B) supporting a yoke 703, with an upper telescoping member connection point 707 being connected to yoke 703, with upper telescoping member connection point 707 being connected to an upper telescoping member 708, with upper telescoping member 708 being connected to an upper arm brace 705, with upper arm brace 705 being connected to a lower telescoping member 720, and with lower telescoping member 720 being connected to a forearm brace 706. Upper arm brace 705 and forearm brace 706 are coupled to an arm 704 of person 700. Force is transferred through forearm brace 706 to lower telescoping member 720, to upper arm brace 705, from upper arm brace 705 through upper telescoping member 708 to upper telescoping member connection point 707, then to yoke 703, to the back structure, to a back-hip interface (not visible in FIG. 7 but analogous to back-hip interface 615 shown in FIG. 6B), to an exoskeleton hip 709, to an exoskeleton leg structure 710, to an exoskeleton foot structure 712, and ultimately to a surface 718. In some embodiments, the telescoping members have more than one movable cylinder. In some embodiments, one or more telescoping members are powered. In some embodiments, one or more telescoping members are passive. In some embodiments, the length of the telescoping members is lockable. In powered embodiments, the length of the telescoping members is shortened during arm flexing motions (e.g., bicep curling/lifting) and lengthened during arm extension motions by the exoskeleton wearer to augment the strength of the arms. In some embodiments, there are no lower telescoping members or forearm braces.

As an example of the seventh embodiment of this invention, consider a worker in a disaster recovery environment engaged in the lifting and movement of rubble and debris. If the worker wearing an exoskeleton were equipped with a powered embodiment of the sixth embodiment of this invention, the worker would be able to lift more rubble or debris materials with his or her arms, allowing the wearer to work faster and more productively with less fatigue and risk of injury.

Figure 8:
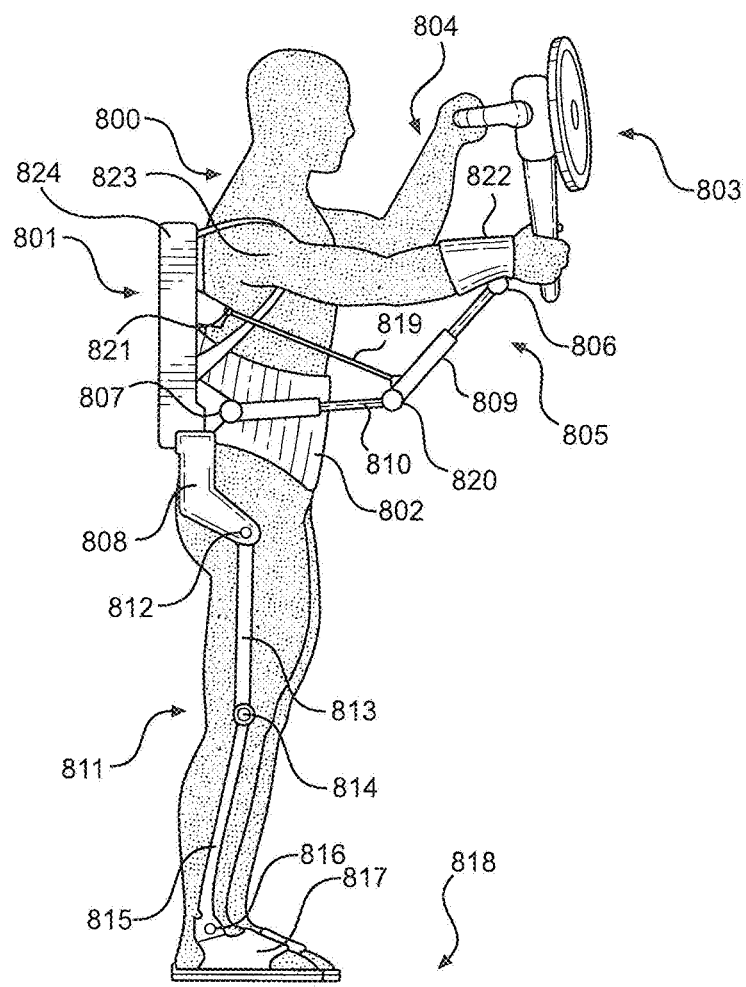
FIG. 8 is a drawing showing a side view of a worker wearing an exoskeleton equipped with a telescoping non-anthropomorphic support arm and arm couplings that link the forearm of the person to the frame of the exoskeleton, representing the eighth embodiment of this invention.

The eighth embodiment of this invention is shown in FIG. 8, with a person 800 wearing an exoskeleton 801, and with exoskeleton 801 being attached to person 800 by strapping 802. A hip structure 808 of exoskeleton 801 is rotatably connected to an arm-supporting device 805 at a hip coupling 807, with arm-supporting device 805 being rotatably connected to a forearm brace 822 at a forearm joint 806, with forearm brace 822 supporting some of the weight of a right arm 823 of person 800, and with arms 804 of person 800 holding a tool 803. Arm-supporting device 805 is comprised of an upper telescoping link 809 and a lower telescoping link 810, with the telescoping links of arm-supporting device 805 being adjustable in length and rotatably connected at link joint 820 such that they allow person 800 to use arms 804 to change the position of forearm brace 822 relative to exoskeleton 801 and person 800. Some of the weight of tool 803 is transferred through right arm 823 to forearm brace 822, through forearm joint 806 to upper telescoping link 809, and then to both lower telescoping link 810 and a tensile member 819. Lower telescoping link 810 transfers a portion of the tool weight supported by arm-supporting device 805 to hip coupling 807 and into hip structure 808 of exoskeleton 801, while tensile member 819 transfers the remainder of the weight of tool 803 through a tensile member connector 821, to an exoskeleton back structure 824, and into hip structure 808 of exoskeleton 801. Hip structure 808 is rotatably connected to a thigh link 813 at a hip 812, with thigh link 813 being rotatably connected to a shank link 815 at a knee 814, and with shank link 815 being rotatably connected to a foot structure 817 at an ankle 816. This connectivity allows the weight of exoskeleton 801, tool-holding arm 805, and the portion of tool 803's weight supported by arm-supporting device 805 to be transferred around legs 811 of person 800, through hip structure 808, through thigh link 814 and shank link 816, into foot structure 817 and ultimately to a surface 818. Person 800 can also walk while wearing exoskeleton 801, with exoskeleton 801 continuing to support a portion of the weight of tool 803 and the weight of tool-holding arm 805. In some embodiments, the forearm brace is quickly separable from the arm of the wearer when not in use. In some embodiments, the arm-supporting device has more than two telescoping links. In some embodiments, the telescoping links are comprised of one or more cylinders. In some embodiments, the telescoping links are passive. In some embodiments, one or more of the telescoping links are lockable at certain lengths. In some embodiments, one or more of the telescoping links are powered. In some embodiments, the hip coupling is a ball joint. In some embodiments, the hip coupling is a hinge joint, restricting the movement of this joint to a single plane. In some embodiments, the hip-coupling joint is fixable at a specific angle. In some embodiments, the link joint is a ball joint. In some embodiments, the link joint is a hinge joint, restricting the movement of this joint to a single plane. In some embodiments, the link joint is fixed at a specific angle, such as 45 degrees or 90 degrees. In some embodiments, the tensile member is rigid. In some embodiments, the tensile member has some stretch. In some embodiments, the tensile member is adjustable in length. In some embodiments, the tensile member is adjustable in length through use of a powered device such as a small winch.

As an example of the eighth embodiment of this invention, consider a worker using a handheld spot welding gun in a manufacturing process. Through the use of the eighth embodiment of this invention, the worker can hold and stably operate the welding gun for longer periods of time than without the device of the eighth embodiment of this invention, and the worker is still able to use his or her hands to interact directly with the welding gun as needed for making small adjustments to positioning. This additional support from the invention can increase worker stamina, which would also lead to increased productivity and a reduced chance of worker injury.

Figure 9:
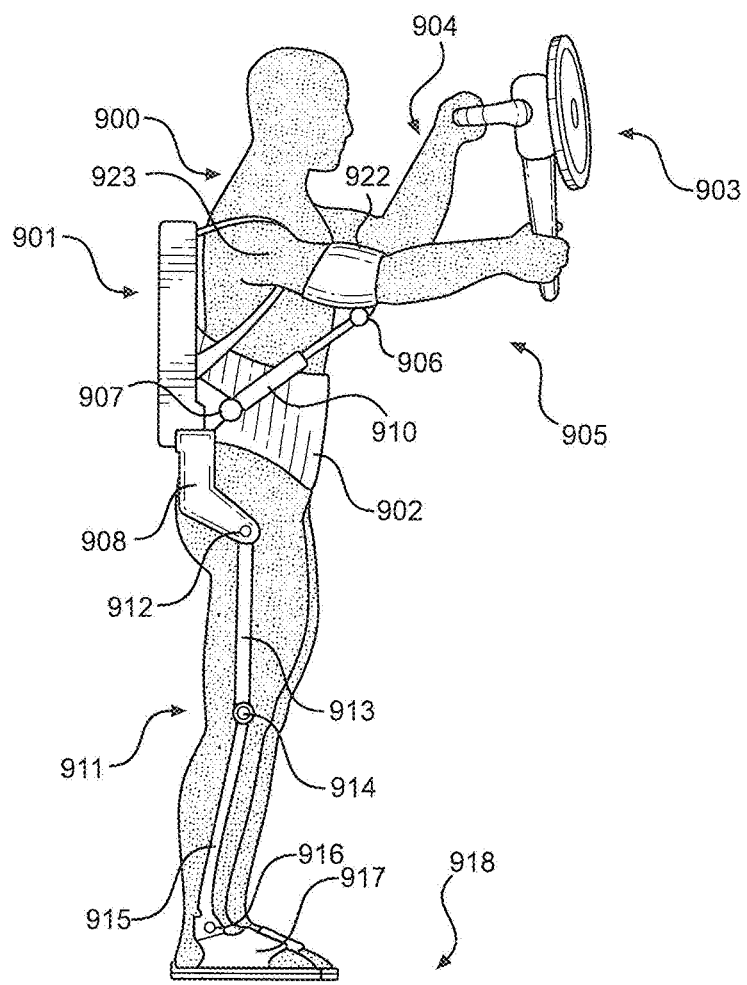
FIG. 9 is a drawing showing a side view of a worker wearing an exoskeleton equipped with a telescoping non-anthropomorphic support arm and arm couplings that link the upper arm of the person to the frame of the exoskeleton, representing the ninth embodiment of this invention.

The ninth embodiment of this invention is shown in FIG. 9, with a person 900 wearing an exoskeleton 901, with exoskeleton 901 being attached to person 900 by strapping 902. A hip structure 908 of exoskeleton 901 is rotatably connected to an arm-supporting device 905 at a hip coupling 907, with arm-supporting device 905 being rotatably connected to an upper arm brace 922 at an upper arm joint 906, with upper arm brace 922 supporting some of the weight of a right arm 923 of person 900 and of a tool 903, and with tool 903 being held in arms 904 of person 900. Arm-supporting device 905 is comprised of a telescoping link 910, with telescoping link 910 being adjustable in length and rotatably connected to both hip coupling 907 and upper arm joint 906, and with upper arm-supporting device 905 allowing person 900 to use arms 904 to change the position of upper arm brace 922 relative to exoskeleton 901 and person 900. Some of the weight of tool 903 is transferred through right arm 923 to upper arm brace 922, through upper arm joint 906 to telescoping link 910, then to hip coupling 907 and into hip structure 908 of exoskeleton 901. Hip structure 908 is rotatably connected to a thigh link 913 at a hip 912, with thigh link 913 being rotatably connected to a shank link 915 at a knee 914, and with shank link 915 being rotatably connected to a foot structure 917 at an ankle 916. This connectivity allows the weight of exoskeleton 901, arm-supporting device 905, and the portion of tool 903's weight supported by arm-supporting device 905 to be transferred around legs 911 of person 900, through hip structure 908, through thigh link 913 and shank link 915, into foot structure 917 and ultimately to a surface 918. Person 900 can also walk while wearing exoskeleton 901, with exoskeleton 901 continuing to support a portion of the weight of tool 903 and the weight of arm-supporting device 905. In some embodiments, the upper arm brace is quickly separable from the arm of the wearer when not in use. In some embodiments, the telescoping link is comprised of more than two cylinders. In some embodiments, the telescoping link is passive. In some embodiments, the telescoping link is lockable at certain lengths. In some embodiments, the telescoping link is powered. In some embodiments, the hip coupling is a ball joint. In some embodiments, the hip coupling is hinge joint, restricting the movement of this joint to a single plane.

As an example of the ninth embodiment of this invention, consider a worker using a relatively light tool, such as a cutting or welding torch, for extended periods of time. Through use of the ninth embodiment of this invention, the worker can hold his or her upper arm stably for very long periods of time without fatigue while maintaining a high degree of forearm dexterity and fine control of tool positioning, with the increase in worker stamina increasing worker productivity and decreasing the chance of injury.

Figure 10:
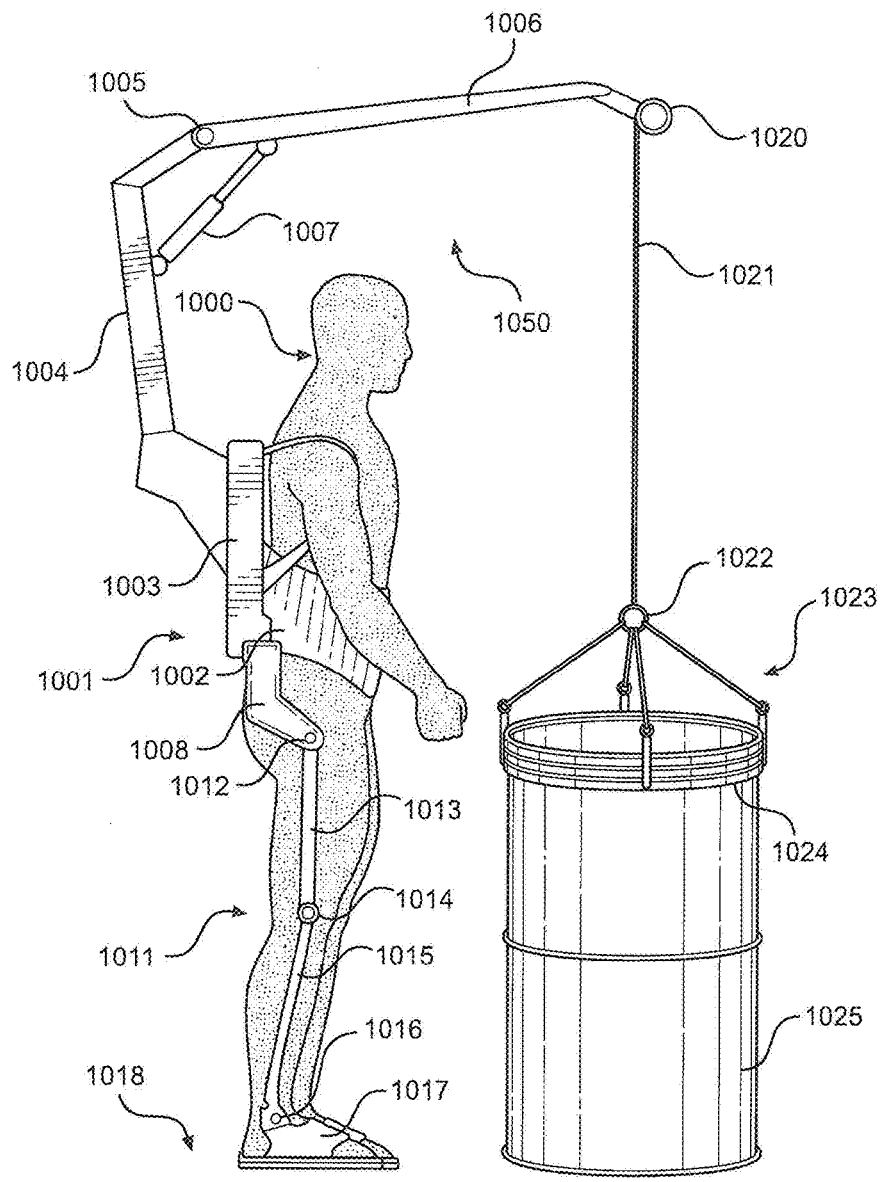
FIG. 10 is a drawing showing a side view of a worker wearing an exoskeleton equipped with a non-anthropomorphic crane-like arm affixed to the back of the exoskeleton that spans over the person and exoskeleton to allow interaction of this arm with objects in front of the exoskeleton, representing the tenth embodiment of this invention.

The tenth embodiment of this invention is shown in FIG. 10, with a person 1000 wearing an exoskeleton 1001, with exoskeleton 1001 being coupled to person 1000 by strapping 1002. A crane structure 1050 is attached to the rear of exoskeleton 1001, with a vertical support member 1004 being attached to an exoskeleton back 1003, with vertical support member 1004 being rotatably connected to a horizontal support 1006 at a joint 1005, and with a telescoping member 1007 being rotatably connected to both horizontal support 1006 and vertical support 1004. A pulley 1020 is attached to the end of horizontal support 1006, with a portion of the length of a cable 1021 being wound around pulley 1020 and another portion of the length of cable 1021 extending down from pulley 1020 to a linkage 1022, with linkage 1022 being connected to a drum clamp 1023, and with drum clamp 1023 being affixed to a drum lip 1024 of a drum 1025. The rotation of pulley 1020 changes the unwound length of cable 1021, with a shortening of cable 1021 resulting in an upwards force being exerted on linkage 1022, drum clamp 1023, and drum lip 1024, resulting in the lifting of drum 1025. The weight of drum 1025 is transferred through cable 1021 to pulley 1020, then to horizontal support 1006, then to vertical support 1004, with vertical support 1004 then transferring this weight to exoskeleton back 1003, and with exoskeleton back 1003 being supported by and transferring weight into a hip structure 1008. Hip structure 1008 is rotatably connected to a thigh link 1013 at a hip 1012, with thigh link 1013 being rotatably connected to a shank link 1015 at a knee 1014, and with shank link 1015 being rotatably connected to a foot structure 1017 at an ankle 1016. This connectivity allows the weight of exoskeleton 1001, drum 1025, and crane structure 1050 to be transferred around legs 1011 of person 1000, though hip structure 1008, though thigh link 1013 and shank link 1015, into foot structure 1017 and ultimately to a surface 1018. Person 1000 can also walk while wearing exoskeleton 1001, with exoskeleton 1001 continuing to support the weight of drum 1025 and crane structure 1050. In some embodiments, the telescoping member is powered. In other embodiments, the telescoping member is lockable in specific adjustable positions. In some embodiments, the pulley is a powered device, such as a winch. In other embodiments, the pulley is a manual device granting the exoskeleton wearer mechanical advantage, such as those seen in unpowered engine hoisting devices. In some embodiments, the crane lifts objects other than drums. In some embodiments, the crane supports a tool at the end of the cable, including heavy handheld tools such as jackhammers. In some embodiments, the crane is smaller, extending over the shoulder but not above the head of the wearer. In some embodiments, the crane can be folded up to reduce size when not in use. In some embodiments, the crane is attached to the side or front of an exoskeleton.

As an example of the tenth embodiment of this invention, consider a worker at a chemical manufacturing facility who is loading liquid-filled 55-gallon drums onto a forklift pallet. It would be very demanding for this worker to load the heavy drums unassisted. Through use of the device of the tenth embodiment of this invention, this worker can easily and safely lift the drums the few inches needed to place them onto the forklift pallet.

Figure 11:
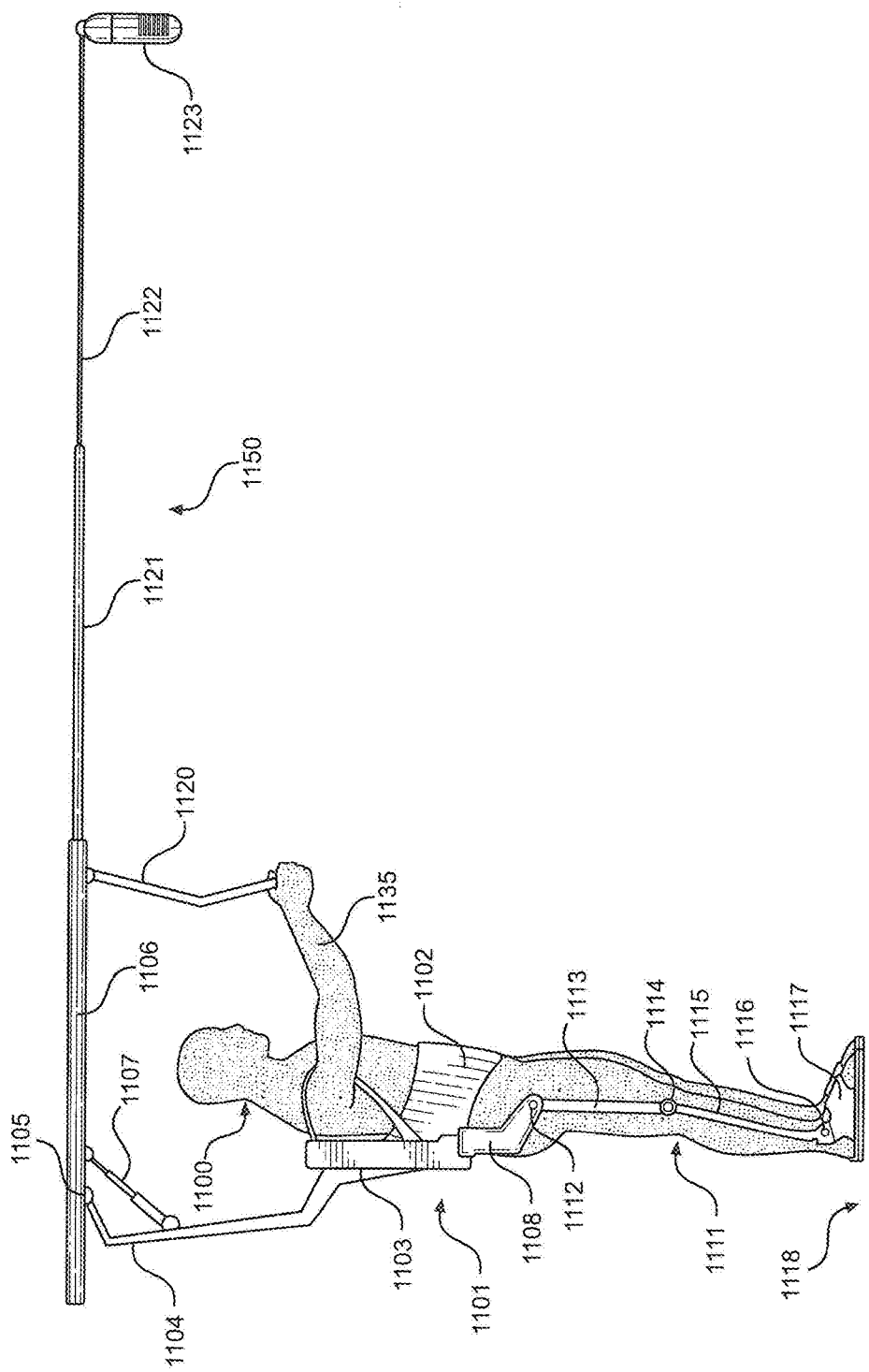
FIG. 11 is a drawing showing a side view of a worker wearing an exoskeleton equipped with a telescoping non-anthropomorphic arm affixed to the back of the exoskeleton that spans over the person and exoskeleton and extends substantially forward of the exoskeleton, with this arm supporting a boom microphone, representing the eleventh embodiment of this invention.

The eleventh embodiment of this invention is shown in FIG. 11, with a person 1100 wearing an exoskeleton 1101, with exoskeleton 1101 being coupled to person 1100 by strapping 1102. A boom structure 1150 is attached to the rear of exoskeleton 1101, with a vertical support member 1104 being attached to exoskeleton back 1103, with vertical support member 1104 being rotatably connected to a primary horizontal support 1106 at a joint 1105, and with a telescoping member 1107 being rotatably connected to both primary horizontal support 1106 and vertical support 1104. Boom structure 1150 is comprised of three telescoping members, primary horizontal support 1106, a secondary horizontal support 1121, and a tertiary horizontal support 1122, with a boom microphone 1123 being attached to the end of boom structure 1150 at tertiary horizontal support 1122. A handle 1120 is attached to primary horizontal support 1106, and person 1100 uses an arm 1135 to manipulate handle 1120 to support, stabilize, and direct the position of boom structure 1150 and boom microphone 1123. Most of the weight of boom structure 1150 is supported by arm 1135 of person 1100, though arm 1135 extends forward in a more ergonomic position relative to the above-the-head position needed for a standard boom. The rear end of boom structure 1150 has a tendency to lift due to the torque resulting from the weight at the front of boom structure 1150, with this lifting motion being resisted by vertical support 1104, and with vertical support 1104 then transferring force to exoskeleton back 1103 of exoskeleton 1101. In some embodiments, there is a counterweight at the rear of the boom structure to balance the boom. In some embodiments, there is an adjustable-length tensile member connected to the rear of the boom structure to prevent the rear end of the boom from rising and the microphone end of the boom from dropping. In some embodiments, one or more telescoping members are powered. In other embodiments, one or more telescoping members are lockable in specific adjustable positions. In some embodiments, the boom is attached to a tool or instrument other than a microphone. In some embodiments, the telescoping members can be collapsed, and the vertical supports can be folded up to reduce size when not in use.

As an example of the eleventh embodiment of this invention, consider a worker recording sound at a movie shoot at an outdoor location away from a studio. Through use of the device of the eleventh embodiment of this invention, this worker can stably control the location of a heavy boom and microphone, even while walking over uneven surfaces. In addition, this embodiment effectively frees up one arm of a boom operator, as the rear arm of the boom operator is replaced by the vertical support arm of the exoskeleton.

The twelfth embodiment of this invention is shown in FIGS. 12A and 12B, with a person 1200 wearing an exoskeleton 1201, and with strapping 1202 coupling person 1200 to the structure of exoskeleton 1201. Exoskeleton 1201 has a powered digging arm 1205, with powered digging arm 1205 being comprised of an upper arm link 1210, a lower arm link 1220, and a shovel 1203, and with powered digging arm 1205 being powered by an energy source 1223. Both powered digging arm 1205 and energy source 1223 are supported by an exoskeleton structure 1208, with exoskeleton structure 1208 being rotatably connected to a thigh link 1219, with thigh link 1219 being rotatably connected to a shank link 1215 at a joint 1214, with shank link 1215 being connected to a base structure 1216, and with base structure 1216 interacting with a surface 1218. In some embodiments, the tool arm is equipped with tools other than shovels, such as a jackhammer, drill, or rotary saw.

As an example of the twelfth embodiment of this invention, consider a rescue worker in a disaster response situation working in a partially collapsed structure. If the tight spaces and uneven surfaces of the structure make bringing in large digging equipment, such as a backhoe or excavator, impractical or impossible, the device of the twelfth embodiment of this invention allows the rescue worker to use a small maneuverable exoskeleton equipped with a powered digging mechanism to dig.

Although described as separate embodiments, the various embodiments of this invention can be combined in a single exoskeleton. For example, the fifth embodiment of this invention can be combined with the tenth embodiment of this invention, allowing for a crane to be mounted at the rear of an exoskeleton on a rotatable support ring. This would allow the exoskeleton crane to lift heavy objects and then rotate the support ring, causing the lifted load to rotate around the exoskeleton to a new location. This would greatly aid in tasks such as loading pallets, since the exoskeleton could stand in place during the rotation of the load rather than being forced to take a series of steps to turn the crane. In another example, the eleventh embodiment can be combined with the eighth embodiment, allowing for an exoskeleton arm support to support the arm of the exoskeleton user that is holding the handle and absorbing much of the weight of the boom, greatly increasing the ease of boom support for this user and allowing him or her to work longer and more easily.

In all embodiments, the exoskeleton can provide power to a power tool—even if the exoskeleton itself is passive and has no power requirements. In powered (actuated) exoskeleton embodiments, the power systems of the tool and exoskeleton can be shared, eliminating the need for disparate energy storage devices. In all embodiments, various sensors, including but not limited to pressure sensors or toggle switches, can be in communication with the exoskeleton control system, allowing the exoskeleton to respond to the user. In all embodiments, the exoskeleton control system can be in communication with any tool electronics or tool control systems, such as power and time settings on a spot welding gun.

Based on the above, it should be readily apparent that the present invention provides a range of devices allowing for an exoskeleton to assist an exoskeleton wearer by directly supporting the weight of various tools and the use of these tools by the exoskeleton wearer, increasing the strength and stamina of the exoskeleton wearer in tool-using tasks. The present invention further provides additional devices allowing for an exoskeleton to support the arms of an exoskeleton wearer in such a way as to improve the strength and stamina of the exoskeleton wearer in tool-using tasks. In addition, the present invention allows an exoskeleton wearer to use tool types or tools in ways that would not be possible without the exoskeleton. The present invention further allows for an exoskeleton to provide power to tools, with the energy source for these tools being supported by the exoskeleton frame but not by the arms of the exoskeleton or wearer. The present invention also provides counterbalancing support to an exoskeleton to support the weight of the tool and exoskeleton structure supporting the tool. Although described with reference to preferred embodiments, it should be readily understood that various changes or modifications could be made to the invention without departing from the spirit thereof. In general, the invention is only intended to be limited by the scope of the following claims.

The invention claimed is:

1. An exoskeleton comprising:
    strapping configured to couple the exoskeleton to a wearer;
    a hip structure;
    a thigh link rotatably connected to the hip structure;
    a shank link rotatably connected to the thigh link, wherein weight of the exoskeleton is transferred to a surface on which the exoskeleton is standing through the hip structure, the thigh link and the shank link;
    an arm brace configured to support an arm of the wearer;
    a telescopic link rotatably connected to the arm brace and the hip structure;
    an energy storage device configured to deliver power through a conduit to a tool operated by the wearer; and
    a conduit-energy storage device coupling configured to connect the conduit to the energy storage device.

2. The exoskeleton of claim 1, wherein the arm brace is configured to support an upper arm of the wearer from a position below the upper arm.

3. The exoskeleton of claim 1, wherein the arm brace is configured to support a forearm of the wearer.

4. An exoskeleton comprising:
    strapping configured to couple the exoskeleton to a wearer;
    a hip structure;
    a thigh link rotatably connected to the hip structure;
    a shank link rotatably connected to the thigh link, wherein weight of the exoskeleton is transferred to a surface on which the exoskeleton is standing through the hip structure, the thigh link and the shank link;
    an arm brace configured to support an arm of the wearer;
    a first telescopic link rotatably connected to the arm brace;
    a second telescopic link rotatably connected to the first telescopic link, wherein the second telescopic link connects the first telescopic link to the hip structure;
    an energy storage device configured to deliver power through a conduit to a tool operated by the wearer; and
    a conduit-energy storage device coupling configured to connect the conduit to the energy storage device.

5. The exoskeleton of claim 1, wherein the energy storage device is a battery.

6. The exoskeleton of claim 5, wherein the exoskeleton is a powered exoskeleton, and the energy storage device is further configured to deliver power to the exoskeleton.

7. The exoskeleton of claim 5, wherein the exoskeleton is an unpowered exoskeleton.

8. The exoskeleton of claim 5, wherein the battery is mounted on a rear of the exoskeleton.

9. The exoskeleton of claim 1, further comprising:
    a tool-holding arm configured to support the tool;
    a tool coupling configured to connect the tool to the tool-holding arm; and
    a plurality of conduit guides configured to route the conduit along the tool-holding arm.

10. The exoskeleton of claim 9, further comprising a hip coupling configured to connect the tool-holding arm to the hip structure.

11. An exoskeleton comprising:
    strapping configured to couple the exoskeleton to a wearer;
    a hip structure;
    a thigh link rotatably connected to the hip structure;
    a shank link rotatably connected to the thigh link, wherein weight of the exoskeleton is transferred to a surface on which the exoskeleton is standing through the hip structure, the thigh link and the shank link;
    an arm brace configured to support an arm of the wearer; and
    a telescopic link rotatably connected to the arm brace and the hip structure.

12. The exoskeleton of claim 11, wherein the arm brace is configured to support an upper arm of the wearer from a position below the upper arm.

13. An exoskeleton comprising:
strapping configured to couple the exoskeleton to a wearer;
a hip structure;
a thigh link rotatably connected to the hip structure;
a shank link rotatably connected to the thigh link, wherein the weight of the exoskeleton is transferred to a surface on which the exoskeleton is standing through the hip structure, the thigh link and the shank link;
an energy storage device configured to deliver power through a conduit to a tool operated by the wearer;
a conduit-energy storage device coupling configured to connect the conduit to the energy storage device;
a tool-holding arm configured to support the tool;
a tool coupling configured to connect the tool to the tool-holding arm;
a plurality of conduit guides configured to route the conduit along the tool-holding arm; and
a hip coupling configured to connect the tool-holding arm to the hip structure.

14. The exoskeleton of claim 13, wherein the energy storage device is a battery.

15. The exoskeleton of claim 14, wherein the exoskeleton is a powered exoskeleton, and the energy storage device is further configured to deliver power to the exoskeleton.

16. The exoskeleton of claim 14, wherein the exoskeleton is an unpowered exoskeleton.

17. The exoskeleton of claim 13, further comprising a hip coupling configured to connect the tool-holding arm to the hip structure.

18. The exoskeleton of claim 4, wherein the second telescopic link connects the first telescopic link to the hip structure.

19. An exoskeleton comprising:
strapping configured to couple the exoskeleton to a wearer;
a hip structure;
a thigh link rotatably connected to the hip structure;
a shank link rotatably connected to the thigh link, wherein weight of the exoskeleton is transferred to a surface on which the exoskeleton is standing through the hip structure, the thigh link and the shank link;
an arm brace configured to support an arm of the wearer;
a first telescopic link rotatably connected to the arm brace; and
a second telescopic link rotatably connected to the first telescopic link, wherein the second telescopic link connects the first telescopic link to the hip structure.

20. The exoskeleton of claim 19, wherein the second telescopic link connects the first telescopic link to the hip structure.

* * * * *